(12) United States Patent
Soule

(10) Patent No.: US 10,787,328 B2
(45) Date of Patent: Sep. 29, 2020

(54) LOADING DOCK LOCKING SYSTEM

(71) Applicant: Liftgate Lok Inc., Portland, ME (US)

(72) Inventor: Jeffrey Soule, Portland, ME (US)

(73) Assignee: Liftgate Lok, Inc., Portland, ME (US)

( * ) Notice: Subject to any disclaimer, the term of this patent is extended or adjusted under 35 U.S.C. 154(b) by 182 days.

(21) Appl. No.: 15/978,083

(22) Filed: May 11, 2018

(65) Prior Publication Data
US 2018/0257881 A1 Sep. 13, 2018

Related U.S. Application Data

(63) Continuation-in-part of application No. 14/921,233, filed on Oct. 23, 2015, now Pat. No. 10,005,628.

(51) Int. Cl.
*B65G 69/00* (2006.01)

(52) U.S. Cl.
CPC .................................. *B65G 69/003* (2013.01)

(58) Field of Classification Search
CPC . B60D 1/583; B60D 1/66; B60D 1/44; B60D 1/46; B62D 53/0878; B62D 53/0857; B62D 21/15; B60R 19/38; B60R 19/24; B65G 69/003; B60P 1/43; B60P 1/431; B60T 7/12; B60T 7/20; B60T 7/22
See application file for complete search history.

(56) References Cited

U.S. PATENT DOCUMENTS

| | | | | |
|---|---|---|---|---|
| 4,958,978 A | * | 9/1990 | Shedleski | B60P 1/6454 280/433 |
| 5,101,927 A | * | 4/1992 | Murtuza | B60T 7/22 180/275 |
| 6,604,765 B1 | * | 8/2003 | Eull | B60R 19/56 293/104 |
| 6,652,010 B1 | * | 11/2003 | Huddle | B60R 19/56 293/102 |
| 7,488,025 B1 | * | 2/2009 | Roberson | B60P 1/433 296/61 |
| 7,530,612 B2 | * | 5/2009 | Regnell | B60R 19/56 293/118 |
| 2001/0030431 A1 | * | 10/2001 | Killday | B60R 19/56 293/118 |

FOREIGN PATENT DOCUMENTS

| | | | | |
|---|---|---|---|---|
| EP | 2143591 A1 | * | 1/2010 | ............. B60R 19/56 |
| GB | 1355586 A | * | 6/1974 | ............... B60T 7/12 |

* cited by examiner

*Primary Examiner* — Glenn F Myers
(74) *Attorney, Agent, or Firm* — Martin E. Hsia

(57) ABSTRACT

A system for allowing a chassis for an intermodal shipping container having fittings and a floor to be secured to a loading dock is provided. The system is capable of being stowed away into the chassis when not in use, and moveable to a locking position for interfacing with the dock's restraining system when the chassis is to be secured to the loading dock.

2 Claims, 20 Drawing Sheets

LOADING DOCK LOCKING SYSTEM

RELATED APPLICATIONS

This application is a continuation in part of, and claims the priority of, presently pending U.S. nonprovisional patent application Ser. No. 14/921,233 filed on Oct. 23, 2015.

BACKGROUND OF THE INVENTION

Field of the Invention

The present invention relates generally to a system for locking or otherwise securing a semi-trailer, a chassis for an intermodal shipping container, a box truck, or another vehicle, to a loading dock. More particularly the present invention relates to a system for locking or otherwise securing a semi-trailer, a chassis for an intermodal shipping container, a box truck, or another vehicle, to a loading dock, that can be stowed away into the semi-trailer, chassis, box truck, or vehicle, when not in use.

Description of Related Art

When loading a trailer, an intermodal shipping container (referred to hereafter as a "container" or "shipping container") on a chassis, or a box truck or other vehicle, from a building, typically an elevated loading dock is used. A trailer is an unpowered vehicle that usually has at least a floor, pulled by a powered vehicle. A semi-trailer does not have a front axle, and a full trailer does. A chassis for a shipping container is an unpowered vehicle for transporting intermodal shipping containers (see below) to be pulled by a powered vehicle, but its body only has a frame that includes two parallel longitudinal I beams (without a floor), and a bolster at the rear with twist locks (see below) at the left and right sides. A box truck is a truck with an enclosed cuboid shaped cargo area. These and other vehicles have a cargo area that is elevated above the ground.

The loading dock allows the trailer, container on its chassis, box truck, or other vehicle, to be backed up to the elevated floor of the loading dock, so that the elevated cargo area can be easily loaded using, for example, fork lifts, hand trucks, and the like. However, during such loading there is a danger that the trailer, container on its chassis, or vehicle, may roll away or otherwise move from the loading dock. This can cause severe safety hazards and damage freight being loaded into the trailer, container, or box truck. Therefore, it is common in the art to lock the trailer, chassis or box truck being loaded to the loading dock, using a loading dock restraining system. Trailers for this type of loading typically have metal members extending downward that can lock to the loading docks. However, vehicles such as trailers, chassis for shipping containers, and cargo box trucks, that do not have a method to securely attach to a loading dock restraining system, are unable to economically, safely and effectively move cargo from the building of the loading dock to the trailer, chassis, or box truck, and vice versa. There are loading dock restraining systems for restraining trailers, chassis or box trucks lacking metal members extending downwards, but they are expensive and complex, such as U.S. Pat. Nos. 6,773,221 and 8,499,897 B2 assigned to Rite-Hite Holding Corporation, incorporated herein by reference, which provide wheel chocks or other structures installed in the ground that can selectively restrain the wheels of vehicles. These cannot be seen if there is deep snow on the ground and cannot easily be ploughed. Also, they cannot be easily seen by the drivers and can be run over, damaging both the system and wheels.

When unloading a trailer or vehicle having an elevated storage area at locations such as at a street side, or ground level, it is not uncommon to have an under mounted "SLIDE OUT" lift that articulates out rearwards from the vehicle or trailer, then lifts and lowers freight from the vehicle's elevated storage area (called a "slideout liftgate"). However, because the slideout liftgate must be stowed underneath the storage area when not in use, any structure extending downward from the body interferes with the liftgate's operation. Therefore, locking structures that allow the semi-trailer or other vehicle to be connected to a loading dock traditionally cannot be used with vehicles using a slideout liftgate.

Therefore, what is needed is a system that can allow a trailer or vehicle with an elevated storage area to be locked to a loading dock, that can also be stowed to allow for a slideout liftgate or other structure to operate on the trailer or vehicle as well.

A majority of mass produced goods in the World are now manufactured in factories and then placed on pallets (palletized) for shipment to market. The pallets are horizontal platforms having two parallel spaced apart horizontal layers that can be handled by fork-lifts, pallet jacks, or other pallet handlers (collectively referred to as "pallet handlers"). The pallet handlers are mounted on wheels and have forks that fit between the layers and can be raised and lowered, so that the pallets can be moved to a desired location by being raised, moved to above the desired location, and then lowered at that location. The forks of the pallet handler can then be removed, and it can then proceed to move the next pallet.

The pallet handlers are used to load the pallets into intermodal shipping containers of standardized dimensions that have twist lock fittings (referred to as "fittings") having oval holes, attached at all the containers' upper and lower corners. The containers and fittings often comply with standards set by the International Standards Organization ("ISO"). These fittings can receive twist locks (also specified by ISO standards), which have a portion that can be received in the oval holes of the fittings and then twisted, so that the twist locks are locked and cannot be withdrawn from the fitting until they are untwisted. Using twist locks and linings, the containers can be securely attached to vehicles of various modes of transportation (such as trucks, trains and boats), to each other (to allow stacking), and to other structures, for ease of handling. The containers are called intermodal shipping containers because they are used for shipping goods using multiple modes of transportation, without unloading the goods from the containers, and they are sometimes called ISO containers because they must meet the standards of ISO. However, intermodal containers for trains are often different from intermodal containers for ships because many intermodal containers for trains may not conform to ISO standards. Many intermodal containers for trains are configured for use with proprietary chassis of specific trucking companies, to prevent use of those containers by competitors, especially where goods do not need to be transported by ship. Thus, the term "container" is not limited to containers that comply with ISO standards, but refers to all containers that can be attached to, and detached from, chassis.

After being loaded with pallets of goods, containers can be attached to chassis or railroad cars, having twist locks for secure attachment of the containers. The chassis or railroad cars are then moved by truck, rail or other means, either to their final destination (if no water journey is necessary) or to ports for loading onto container ships. Because the fittings are on both the upper and lower corners of the containers, the containers can be slacked on the container ships and securely attached to each other using twist locks and the fittings on the containers. These container ships then transport the containers to a port near the final destination. At the port, the containers are then unloaded from the container ships using cranes, and again securely attached to chassis or railroad cars using twist locks. If the containers are attached to railroad cars, then the containers are transported to railroad yards, where large forklifts remove the containers from the railroad cars and place them on chassis (ISO containers only have doors on their ends, and do not have doors on their sides, so containers attached to railroad cars cannot be directly unloaded at open or closed loading docks—railroad cars' couplings (for linking to other railroad cars) prevent the containers' doors from abutting against loading docks for unloading using pallet jacks).

The containers on chassis (either from ports or from railroad yards) are then transported to a warehouse having a loading dock. The loading docks are usually elevated to approximately the level of the interior floor, of the container when the container is still attached to the chassis, so that pallet handlers can move easily between the loading dock of the warehouse and the interior of the container or railroad car, to unload the pallets of goods.

There is often a slight difference between the level of the loading dock and the level of the interior floor of a container, so that a ramp or other device (called a "loading dock, leveler" or "dock leveler") is often used to allow the pallet handlers to move easily between the loading dock and the floor of the interior of the container.

After the palletized goods are unloaded into the warehouse by personnel who usually perform unloading work, other personnel must assign the palletized goods to designated areas of the warehouse, called "slots." The various types of palletized goods must then be transported to the proper assigned slots in the warehouse. This process is called "slotting." However, the goods cannot be placed in a slot at random because the goods on the shelves in any particular slot must be "rotated" to preserve freshness, especially for perishable food products and food products with expiration dales. For example, newly arrived goods may be placed on the top shelf of a slot, and goods to be delivered may be "picked" from the bottom shelf of the slot. After the bottom shelf of the slot, is emptied, the goods in the higher shelves will all be moved to the next lower shelf. This "rotation" is done to assure that all goods are fresh; otherwise, some goods may not be picked until the slot has been completely emptied, which may be very rarely. Of course, the warehouse must maintain the goods under good storage conditions after they have been slotted and rotated. Obviously, this rotation of goods, and the supervision to assure that goods are properly slotted and rotated, are costly. Warehouse discount stores, such as Costco, are able to offer goods at substantially lower costs than conventional retail locations partly because consumers can purchase goods at the warehouse, directly from the pallets, thus avoiding the costs of the additional steps described below that retailers must incur to get the goods into their retail locations, ready for sale.

When goods are to be delivered to retail locations, they must be "picked," that is, warehouse personnel must select the palletized goods to be delivered for the particular retail locations, and must retrieve those palletized goods from the appropriate slots. The picked goods then must be "routed," that is, the palletized goods for the last destination must be loaded into a delivery vehicle first, and the goods for the first destination must be loaded into the delivery vehicle last, for example. If the goods are not routed properly, the palletized goods for the first destination will be behind other pallets (and inaccessible) when the delivery vehicle arrives at the first destination, for example.

There are two types of loading docks in common use, "open" and "closed." In an open loading dock, only an elevated dock floor is provided, so that the interior of the container (and often the interior of the warehouse) are exposed to the environment while the container is being unloaded. However, it is strongly desired, especially when dealing with food, that unloading take place at "closed" loading docks, in which the entire rear end of the container is sealed against the environment while the container is being unloaded. This normally requires that the loading dock be structured as an elevated door in a wall, so that the side walls and the ceiling of the container abut against the wall around the loading dock (or against or inside a sealing engagement apparatus around the periphery of the loading dock) when the floor of the container abuts against the loading dock. Closed loading docks normally do not have recesses to receive projections extending rearwardly from the rear ends of containers.

It is preferable that a closed loading dock also provide some kind of sealing engagement apparatus so that the entire circumference of the rear end of a container is sealingly engaged with the periphery around the loading dock when the container abuts against the loading dock. Ideally, daylight should not be visible between the rear end of the container and the periphery of the closed loading dock when the container is being unloaded. The sealing engagement apparatus could be as simple as a gasket around the periphery of the door of the closed loading dock, or could also include more elaborate sealing mechanisms, such as telescoping shrouds or accordion pleated extensions. Regardless of the particular structure of the sealing engagement apparatus, it should prevent birds, rodents, insects, dust, heat, humidity and other environmental contaminants from entering into the container and the warehouse (with its stockpiled cargo from other containers) while a container is being unloaded. This sealing engagement apparatus is referred to as a loading dock seal, or weather seal. Thus, it is important that the rear ends of conventional shipping containers be substantially free of rearwardly extending projections so that the entire circumference of those rear ends can abut against, and sealingly engage with, a closed loading dock.

It is not preferred to drive a container into the interior of a warehouse for unloading because it would take too much warehouse space, and because workplace rules restrict the amount of carbon monoxide and other pollutants generated by vehicles that can he introduced into a closed work environment. Thus, containers are almost always unloaded at elevated loading docks on the outside of a warehouse, and the palletized goods are then brought into the warehouse from the dock using pallet handlers.

Conventionally, when a retail location or other end destination (collectively referred to as "retail location") requires a quantity of a product, a number of pallets of the desired product are picked and routed in the warehouse and loaded onto a delivery truck or vehicle using a pallet handler. The delivery truck or vehicle then is driven to the retail location, where it is unloaded.

The delivery vehicle is usually provided with a liftgate, which provides a platform that is movable between ground level and the elevated interior floor of the delivery vehicle's cargo space. Conventionally, liftgates also are storable in a folded, vertical, or other compact configuration so that they are out of the way when not being used, such as when the vehicle is being driven between locations. Slideout liftgates are one of these types of liftgates.

Individual pallets are unloaded at the retail location, usually using a pallet handler that may be carried by the delivery vehicle or be available at the retail location. The pallet handler usually picks up a pallet and then moves onto the liftgate while carrying the pallet. The liftgate then is lowered to ground level, and the pallet and pallet handler are moved off the liftgate and into the retail location. These steps are repeated until the desired number of pallets have been unloaded at the retail location. After the pallets have been unloaded, personnel at the retail location must remove the goods from the pallets and prepare and place them on display for retail sale.

Deliveries to retail locations cannot be made directly from shipping containers on chassis, because retail locations normally are not provided with an elevated loading dock, so that pallets bearing the products cannot normally be unloaded from the container using a pallet handler. Containers are not usually provided with platform extensions or liftgates because they must be packed tightly, abutting each other, for shipment by boat. Chassis for transporting containers are not usually provided with platform extensions or liftgates either, except as described below.

U.S. Pat. No. 5,827,037 to Wilson, incorporated herein by reference, discloses a chassis for receiving and transporting shipping containers having a platform extension and a liftgate that can be moved between a position level with the platform extension and ground level, allowing a pallet handler to unload palletized cargo directly from the container at various retail locations without an elevated loading dock. However, column 5, lines 5-8, state that the platform extension prevents the container from being unloaded at a closed loading dock.

After all the pallets in a shipping container have been removed, the empty shipping container must be removed and reused. However, transporting empty shipping containers is wasteful—this problem is called "backhaul."

For semi-trailers and box trucks, liftgates often cannot be used because companies will not load vehicles without a dock restraint system for the safety reasons described above. Dock restraint systems require a downwardly extending structure ("attachment point") on the vehicle with which the dock restraint system can engage, and such a downwardly extending structure would block most liftgates from operating: before the present invention, a vehicle could have an attachment point or a liftgate, but not both.

Because retail locations or other distribution points usually do not have elevated loading docks, and because loaded semi-trailers or box trucks may not have liftgates, the goods sometimes must be unloaded manually, by removing individual items (such as cases) from pallets and then manually moving them across the elevated interior floor of the container, then down to ground level, and then into the retail location or other distribution point, which is highly labor intensive and inefficient. The problems of loading and unloading semi-trailers or box trucks that have liftgates but lack attachment points (and vice versa), including backhaul, are described in the article published at http://www.truckinginfo.com/blog/trailer-talk/story/2016/06/lift-gate-trailers-can-load-normally-with-new-lok-devices.aspx, which is incorporated herein by reference.

In natural disasters or other scenarios, emergency and other supplies often can be brought into ports on shipping containers, but personnel or equipment may not be available to transport the containers to warehouses for unloading, slotting and then later picking and delivery of palletized goods by delivery trucks to centers for distribution to victims. If palletized goods could be unloaded directly from shipping containers, then the palletized emergency and other supplies could be distributed directly to victims from the shipping containers, providing relief much more quickly and easily.

Further, to address the problem of backhaul, it would be ideal to re-fill empty containers with other palletized goods as soon as possible, so that the refilled containers can then be transported to the next destination. However, many companies will not re-fill empty containers, trailers, box trucks, or other vehicles, at their elevated loading docks, unless there is a dock restraint system, in order to avoid the problems of damage and injuries if a container on a chassis, trailer, box truck, or other vehicle, moves away from the loading dock while a pallet handler is loading, as described above.

Thus, there is a need for a chassis for an intermodal shipping container that will allow unloading of palletized goods using a pallet handler directly at retail locations or other distribution points that lack an elevated loading dock (which requires use of a liftgate), yet, to minimize backhaul, can also be reloaded with palletized goods using a pallet handler at both open and closed loading docks (which requires use of a dock restraint system), even though prior art dock restraint systems prevented the use of liftgates, and prior art liftgate systems with platform extensions could not be used at closed docks, as explained above.

SUMMARY OF THE INVENTION

The subject matter of this application may involve, in some cases, interrelated products, alternative solutions to a particular problem, and/or a plurality of different uses of a single system or article.

In one aspect, a loading dock locking system is provided. The loading dock locking system is configured to be connected or otherwise installed on a vehicle or trailer or chassis to allow the vehicle/trailer/chassis to be restrained by a loading dock vehicle restraining system which holds the vehicle/trailer/chassis in place. The loading dock locking system may comprise a U-shaped member configured to be locked to a loading dock. The U-shaped member has at least one elongate arm and a perpendicular bar connected to a distal end of the elongate arm, and therefore may not necessarily be U-shaped. However, it is referred to herein as "U-shaped" for convenience, because the presently preferred embodiment is U-shaped.

The term "U-shaped member" means and includes any attachment point or other member having at least one elongate arm and a structure for engagement, by a loading dock restraining system, such as a substantially perpendicular bar, loop, hook or other engageable structure (singly and collectively referred to as a "bar").

The bar or other structure is configured to be locked to the vehicle restraining system of the loading dock. This U-shaped member is stowable such that when not in use, it can be hidden away, providing both safety and functionality enhancements to the vehicle/trailer. The U-shaped member is movable between this stowed position and a vertical locking position. In the stowed position, the arm is positioned tinder or within the body of the vehicle or trailer or chassis, for example, such that the U-shaped member is oriented approximately parallel to a floor of the body of the trailer or vehicle or chassis. In the vertical locking position, the arm is extended from the body and is oriented approximately vertically downward away from the body. In the vertical locking position, the loading dock's vehicle restraining system may interface with the bar, thereby preventing the vehicle from accidentally moving or shifting from the building. Indeed, in some embodiments, the loading dock locking system can be retrofitted onto existing trailers, chassis and other vehicles.

In another aspect, a method of locking a vehicle or trailer or chassis to a loading dock is provided. This method may begin with positioning a vehicle and/or trailer and/or chassis have a loading dock locking system of the present invention by a loading dock. This system may have a U-shaped member configured to be locked to a loading dock. In one embodiment, the U-shaped member may have two elongate arms and a perpendicular bar connected to a distal end of each elongate arm, the bar being configured to be locked to a vehicle restraining system of the loading dock. The U-shaped member is movable between a stowed position and a vertical locking position. In the stowed position, the arm is positioned under or within the body of the vehicle or trailer or chassis, such that the U-shaped member is oriented approximately parallel to a floor of the body. In the vertical locking position, the arm is extended from the body and is oriented approximately vertically downward away from the body. Preferably, the method further involves drawing the U-shaped member away from the rear of the trailer to an extended horizontal position. Next, the U-shaped member may be swung downward from the extended horizontal position to the vertical locking position. The U-shaped member is then locked in place in this vertical locking position. The trailer or chassis or vehicle may then be backed up to abut the loading dock, and the bar may be locked to the loading dock's vehicle restraining system.

Thus, the invention preferably comprises a chassis for an intermodal shipping container which has twist locks to engage with fittings on the container and a loading dock locking system connected to the rear of the body. The loading dock locking system comprises a U-shaped member configured to be locked to a loading dock. The U-shaped member preferably has two elongated arms and a perpendicular bar connected to a distal end of the elongated arm, and the bar is configured to be locked to the loading dock. The U-shaped member is movable between a stowed position for when the liftgate is being operated for unloading at a retail location, or for loading at shippers that do not have elevated loading docks, or when the chassis is in transport, such that the arm is positioned under or within the body, oriented approximately parallel to the floor of the body, and a vertical locking position for locking the chassis to the loading dock, such that the arm is extended from the body and is oriented approximately vertically downward away from the body. A slideout liftgate is mounted under the body and forward of the vertical locking position, so that the U-shaped member can be moved to the vertical locking position without being blocked by the slideout liftgate, and so that when the U-shaped member is in the stowed position, the slideout liftgate can be deployed to provide a platform movable between abutting the floor and the ground.

A safety braking system in communication with at least one of the wheels of the chassis can be provided, and can be configured to activate automatically if the U-shaped member is not in the stowed position. Activation of the safety braking system can cause at least one of the wheels to stop rotating.

The chassis can further comprise a switch in communication with the safety braking system, to be physically actuated when the U-shaped member is in the stowed position, the actuation of the switch preventing activation of the safety braking system.

The chassis can further comprise an electronic sensor in communication with the safety braking system, the electronic sensor being positioned to be actuated when the U-shaped member is in the stowed position, preventing activation of the safety braking system.

The safety braking system can be configured to activate when the plurality of wheels are rotating above a predetermined rate.

The U-shaped member is slideable from the stowed position to an extended horizontal position, and only when in the extended horizontal position is hingedly movable from the extended horizontal position to the vertical locking position about an axis at a proximal end of the arm.

The U-shaped member can be positioned below the floor of the body when in the stowed position.

The arm can have a stowed position aperture at a distal end of the arm, and a vertical locking position aperture at a proximal end of the arm; and the chassis can have a spring loaded pin configured to fit into each aperture, the spring loaded pin having a spring biasing it into the apertures and being movable away from the apertures, so that when moved away, the U-shaped member may move between the stowed and vertical locking positions and when the spring loaded pits passes through the apertures, the U-shaped member is prevented from movement.

Preferably, the U-shaped member has two arms, each arm joined together by the bar at the distal end of each arm.

The chassis can have a gusset plate attached to a floor of the body, the arm connectable to the gusset plate when in the vertical locking position.

The arm can be slideable within a channel formed by a tube when moving to and from the stowed position.

The chassis can include a loading dock locking system connected to the body at the rear, and the loading dock locking system comprises a U-shaped member configured to be locked to a loading dock. The U-shaped member has two elongate arms and a perpendicular bar connected to a distal end of each elongate arm, the bar configured to be locked to the loading dock. The U-shaped member is movable between a stowed position for when the chassis is in transport, such that the arm is positioned under or within the body, having the U-shaped member oriented approximately parallel to a floor of the body, and a vertical locking position for locking the chassis to the loading dock, such that the arm is extended from the body and is oriented, approximately vertically downward away from the body. The U-shaped member is slideable from the stowed position to an extended horizontal position, and only when, in the extended horizontal position is hingedly movable from the extended horizontal position to the vertical locking position about an axis at a proximal end of the arm.

A sensor can be in communication with the braking system, and positioned to be physically actuated when the U-shaped member is in the stowed position.

The chassis can have an electronic sensor in communication with the braking system, the switch being positioned to be physically actuated when the U-shaped member is in the stowed position to prevent activation of the safety braking system.

The braking system can be configured to activate when the wheels are rotating above a predetermined rate.

Preferably, the U-shaped member is slideable from the stowed position to an extended horizontal position, and when in the extended horizontal position is hingedly movable from the extended horizontal position to the vertical locking position about an axis at a proximal end of the arm.

The chassis can have each arm slideable within a channel formed by a tube when moving to and from the stowed position.

The invention also includes a method of locking a chassis for an intermodal shipping container to a loading dock comprising providing a loading dock locking system at a rear of the body which has a U-shaped member configured to be locked to a loading dock (the U-shaped member has two elongate arms and a perpendicular bar connected to a distal end of each elongate arm, and the bar is configured to be locked to the loading dock; the U-shaped member is movable between a stowed position for when the chassis is in transport, such that the arm is positioned under or within the body and having the U-shaped member oriented approximately parallel to a floor of the body, and a vertical locking position for locking the chassis to the loading dock, such that the arm is extended from the body and is oriented approximately vertically downward away from the body), drawing the U-shaped member away from the rear of the chassis to an extended horizontal position, swinging the U-shaped member downward from the extended horizontal position, to the vertical locking position, backing the chassis until the rear of the container is aligned with the loading dock; and locking the bar of the U-shaped member to a locking structure of the loading dock.

The method can further include the steps of unlocking the bar of the U-shaped member from the locking structure of the loading dock; swinging the U-shaped member upwardly to the extended horizontal position; and pushing the U-shaped member inward towards the chassis to the stowed position.

The method can further include the step of drawing the U-shaped member away from the rear of the chassis by releasing a securing mechanism holding the U-shaped member in the stowed position.

The invention further comprises a loading dock locking system for connection to a vehicle having a body with an elevated cargo space and a slideout liftgate, comprising a U-shaped member having at least one elongate arm and a bar connected to a distal end of the elongate arm, the bar configured to be locked to the loading dock. The U-shaped member is capable of being mounted to the body to be movable between a stowed position such that the arm is positioned under or within the body, having the U-shaped member oriented approximately parallel to a floor of the body, and a vertical locking position such that the arm is extended from the body and is oriented approximately vertically downward away from the body. Also, vertical locking position is rearward of the liftgate, whereby the U-shaped member can be moved to the vertical locking position without being blocked by the liftgate, and whereby when the U-shaped member is in the stowed position, the liftgate can be deployed to provide a platform movable between abutting the elevated cargo space and the ground.

The invention further comprises a loading dock locking system for a chassis for an intermodal shipping container, comprising: a U-shaped member having at least one elongate arm and a bar connected to a distal end of the elongate arm, the bar configured to be locked to the loading dock. The U-shaped member is capable of being mounted to the chassis to be movable between a stowed position such that the arm is positioned under or within the chassis, having the U-shaped member oriented approximately parallel to a floor of the chassis, and a vertical locking position such that the arm is extended from the chassis and is oriented approximately vertically downward away from the chassis.

A process is provided for using a chassis having a liftgate and a loading dock locking system, where the liftgate can be retracted to avoid interfering with the loading dock locking system, and the container can abut against the loading dock. To practice this method, the liftgate does not need to be a slideout liftgate, and the loading dock locking system does not need to be the U-shaped member of this application. The container then can be transported on the chassis to a retail location lacking an elevated loading dock. Goods can be unloaded from the container at the retail location by extending and using the liftgate, resulting in an empty container. The liftgate can then be retracted and the empty container can be transported to a loading dock. The container can abut against the loading dock and the chassis can be locked to the loading dock using the loading dock locking system. The container can then be reloaded.

The invention also includes a chassis as described above, further comprising a liftgate mounted under the body and forward of the vertical locking position, whereby the U-shaped member can be moved to the vertical locking position without being blocked by the liftgate, and whereby when the U-shaped member is in the stowed position, the liftgate can be deployed to provide a platform movable between abutting the floor and the ground.

As can be seen from the above, the invention is extremely valuable because it provides major advantages in shipping and distribution of goods and saves tremendous amounts of money. Because the chassis allows a container to BOTH be locked to a loading dock, and also be loaded and unloaded without a loading dock using the slideout liftgate, several links in the normal chain of distributing goods, and the waste of backhaul of empty containers, can be virtually eliminated, intermodal shipping containers can be taken directly to retail locations and directly unloaded, even if no loading dock is available, through use of the slideout liftgate. This eliminates the need for warehousing, slotting, picking and delivery. Further, after the container has been emptied, it can be loaded again with other goods, because it can be locked to a loading dock, thus greatly reducing the lost time and money of backhaul.

DETAILED DESCRIPTION

Figure 1:
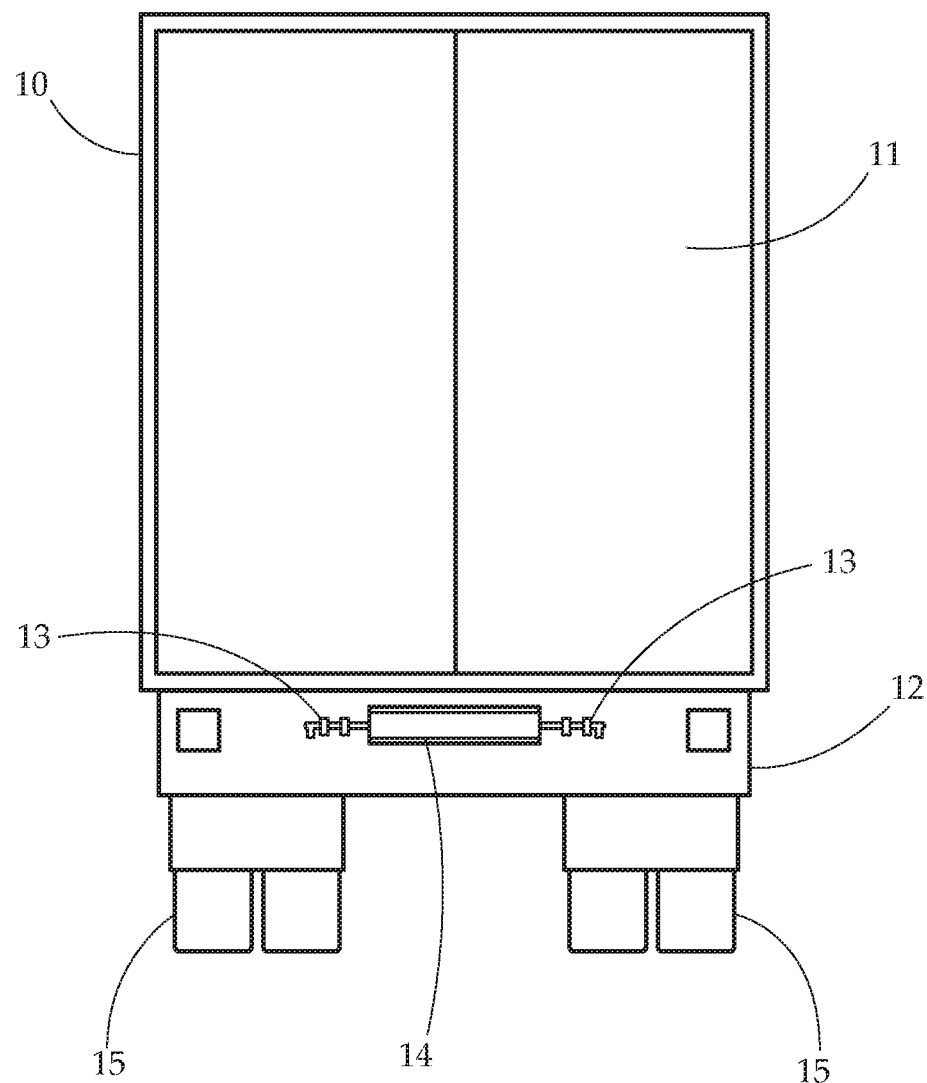
FIG. 1 provides a view of a trailer having an embodiment of the loading dock locking system of the present invention in a stowed position.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a mechanism to facilitate the locking of a trailer to a loading dock. The mechanism is stowable, such that when the trailer is not secured to the loading dock, the mechanism is hidden away within, for example, the structure of the trailer. This configuration allows the present invention to not interfere with movable lift gates, crash barriers (rated and approved bumpers, among others), and other structures that are below or move below the floor of the trailer.

The term "trailer" will be used herein to refer to any portion of a vehicle or structure connectable to a vehicle that can be abutted to a loading dock. This may include semi-trailers, full trailers, a rear portion of a cargo box truck, an intermodal shipping container mounted on a chassis, and the like. The term trailer is a non-limiting term may apply to any and all of these structures, among others.

When the present invention is implemented on the back of trailers, it allows the trailer to be loaded at a loading dock safely, while also allowing the trailer to have an adjustable lift for loading or unloading at a non-loading dock site, such as on the street. Moreover, because the loading dock locking system is stowable, it need not be designed for car crash situations where its downward protrusion can be dangerous. As such, traditional crash barriers and/or bumpers may be used and the trailer need not be substantially modified to accommodate the present invention. However, in some embodiments, the loading dock locking system may be designed to have a width equal to the width of the rear of the vehicle (+/−10%), and may be designed to also operate as a crash barrier. In such an embodiment, the loading dock locking system may be stowed when using a mechanical lift, and may be kept in a vertical locking position during driving and operation to act as both a crash barrier and also a loading dock lock. Further still, the present invention may be retrofitted to existing trailers with only minor labor and material costs by making use of existing space below a deck of the trailer and by attaching the invention to the structure of the trailer.

The loading dock locking system of the present invention may be formed by a U-shaped member that is movable from a stowed position where it is slid approximately horizontally into an area of the trailer, to a vertical locking position where it extends from the trailer approximately vertically downward at a rear end of the trailer. However, it should be understood that any structure capable of attachment to a loading dock's vehicle restraint system may be used without straying from the scope of this invention. The term U-shaped member will be used herein for simplicity with the understanding that the connecting structure may be any shape without straying from the scope of the invention. The U-shaped member provides an attachment point for, and therefore can be used with, all types of vehicle restraint systems that utilize a hook or other similar restraining member that engages with a bar, loop, or similar structure.

The U-shaped member may move between these positions in any way, however typically it may slide and pivot between the two positions. The U-shaped member may be secured in each position by, for example, pins, clamps, frictional structures, and the like. When in the vertical, locking position of the U-shaped member, the trailer may interface with a loading dock restraining system to be locked in place to the loading dock via the U-shaped member. This prevents the vehicle's accidental movement away from the dock. This locking may be done by existing, prior art dock restraining systems mounted to, or adjacent to, the loading docks. For example, one common dock restraining system is the Dok-Lok® of the Carlson Company. While in most embodiments the U-shaped member may be a unitary piece, in one embodiment it may be telescoping in length, having more than one lengthwise piece that may slide into each other to move between the stowed and locking positions.

The U-shaped member may be made of any materials resilient enough to attach the trailer securely to the loading dock restraining system. Materials of which the U-shaped member maybe made include, but are not limited to: metals, plastics, wood, composite materials, ceramics, and the like.

Further, the loading dock locking system may, in some embodiments, comprise a safety mechanism that may ensure that the loading dock locking system is in the stowed position before transport. In one embodiment, the safety mechanism may be an alarm. In another embodiment, the safety mechanism may be a light on an instrumentation panel in the passenger area. In still another embodiment, the safety mechanism may be any structure or controller configured to either apply the brakes of the trailer, or otherwise lock wheels of the trailer in position to prevent movement of the trailer.

In a particular embodiment, the safety mechanism may apply the trailer's brakes at a certain predetermined speed of the trailer, which may allow the trailer to be moved away from the loading dock slowly. In still a further embodiment, the trailer brakes may be automatically applied when the trailer is moving at approximately three miles per hour if the system is not in the stowed position.

In one embodiment, the safety mechanism may be controlled by a physical actuator biased in the braking position that, when actuated, releases the brakes or disables the safety mechanism. In this embodiment, when the locking system U-shaped member is drawn away from its fully secured stowed position, its physical absence will allow the actuator of the safety mechanism to move to a braking position. This physical actuator may be, for example, a button, lever, tab, or the like that can be moved to a free, non-braking position by the presence of the U-shaped member in the stowed position. The physical actuator may also be tied to a locking pin that may hold the U-shaped member in the stowed position.

In another embodiment, a sensor may be used to detect a presence of the U-shaped member in the stowed position. This sensor may be electronic and may utilize an electronic and/or computerized safety system.

The present invention, in many embodiments, has the U-shaped member slideably positioned in a substantially horizontal position (+/−15 degrees) when in the stowed position within a housing formed by the trailer or connected to a structure of the trailer. In a particular embodiment, when in the stowed position, the U-shaped member may be approximately parallel to a floor of the trailer body. When a user wishes to move the device to the vertical locking position, a securing lock may be released (such as a pin, a clamp, detent, seat, or the like). The user may then pull the U-shaped member outward away from a rear of the trailer until it reaches its maximum extended position. The U-shaped member, in one embodiment, may have a tab, flange, spring-loaded pin fitting into an aperture of the member, or the like to prevent it from being fully removed from the housing and to identify its maximum extended positon. The member may, at this extended position, be movable to a vertical position (+/−15 degrees) about an axis defined at its proximal end opposite to the bar by the trailer. Once in the vertical locking position, it may be secured in place by, for example, a lock, clamp, detent, seat, spring loaded tab fitting into a hole of the member, or the like. The user may then lock the distal end (having the bottom of the 'u') of the U-shaped member to the loading dock.

The present invention may be used in any manner and may be moved between the stowed position for transport and vertical locking position for securing to the loading dock in a number of ways. In one embodiment of use, the vehicle having the loading dock locking system may be positioned nearby to the loading dock. At this point, the U-shaped member can be moved from the stowed position to the vertical locking position to allow the trailer of the vehicle to be connected to the loading dock. This may be done by, in this embodiment, drawing the U-shaped member horizontally outward and away from the rear of the vehicle. At a maximally extended position of the U-shaped member, it will be in a horizontally extended position and will be prevented from moving further in this direction. At this point, the U-shaped member may be swung downward in a hinged manner about an axis at the proximal end of the arms opposite to the bar. Once the U-shaped member is swung downward to a vertical positon, it may lock in place and be ready for interlacing with the loading dock vehicle restraining system. The trailer may then be positioned abutting (or very close to) the loading dock. When in position, the bar of the U-shaped member will be in proper position to interlace with the dock's vehicle restraining system. Once interlaced, the trailer will be prevented from any substantial movement.

When the trailer is finished being loaded, the dock's restraining system may be disengaged from the bar. At this point, the trailer may be slowly drawn away from the loading dock. Once far enough away, the U-shaped member may be returned to the stowed position. This may be achieved by releasing or unlocking (depending on embodiment) the U-shaped member from its vertical locking position. The U-shaped member may then be swung upwardly (in an opposite motion to the downward swinging) to the horizontally extending position. Then from the horizontally extending position, the U-shaped member may be pushed inward toward the trailer until it is fully in the stowed position.

The U-shaped member may be movable between the stowed position and the vertical locking position in any manner. For example, the movement may be done manually by a user in one embodiment In another embodiment, an automated system may move the U-shaped member between the stowed and vertical locking position. In the automated system embodiment, a motor, springs, pistons, drives, or other motive system may be used to achieve this movement. The motive system may be in communication with the U-shaped member.

Turning now to FIG. 1, a view of the present invention in the stowed position is provided. A rear of a trailer 10 such as a semi-trailer, shipping container attached to a chassis, cargo box truck, or the like for freight shipping and other transport is shown. The rear of the trailer 10 has a door 11. Below the door is the bumper 12 and wheels 15. Between the bumper 12 and door 11 is the loading dock locking structure, with bar 14 and latches 13 being visible. The bar 14 is a lower part of a U-shaped member (see FIGS. 2-4) that is movable between the stowed position as shown in this figure and a vertical locking position. When in the vertical locking position, the U-shaped member (and thus the trailer) may be locked in a secured position to a loading dock.

Figure 2:
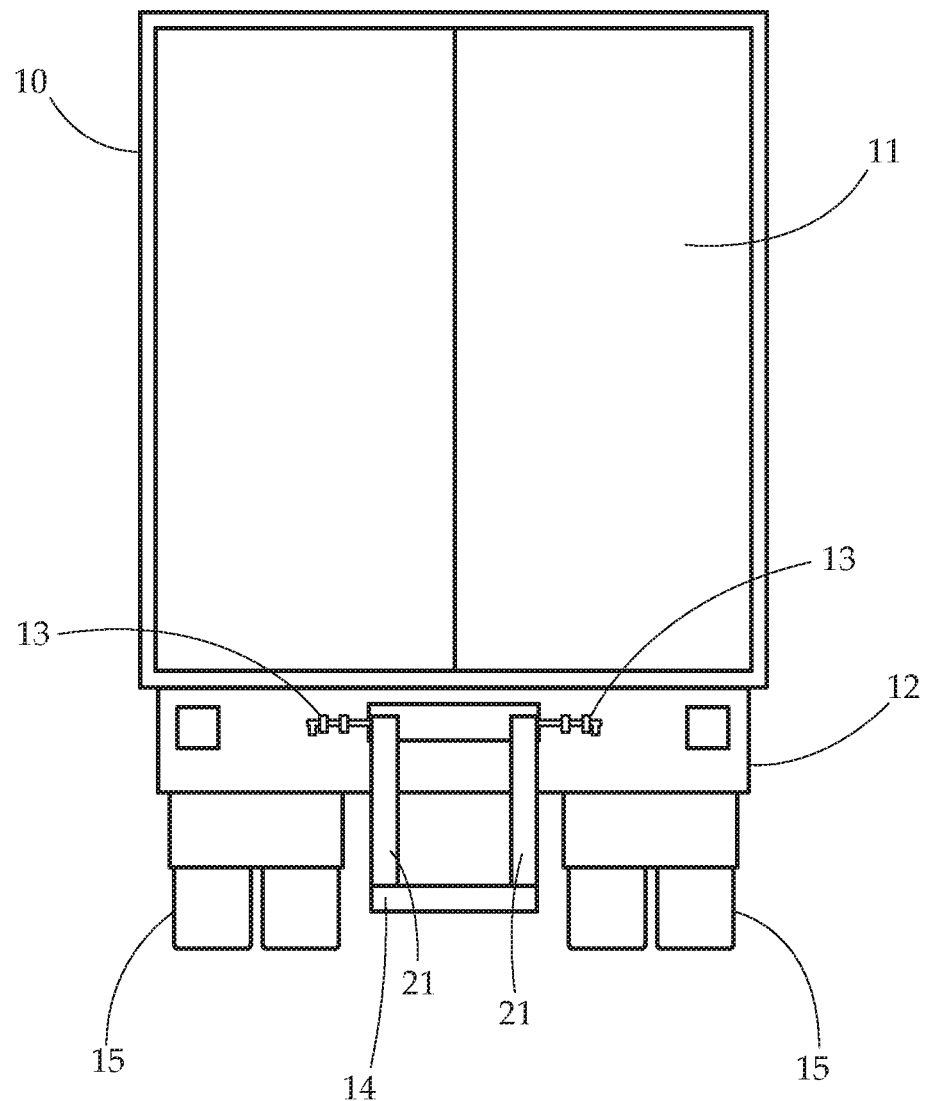
FIG. 2 provides a view of a trailer having an embodiment of the loading dock locking system of the present invention in a vertical locking position.

FIG. 2 shows another embodiment of the present invention in the vertical locking position. In this view, the U-shaped member can be seen which comprises bar 14 connecting to two approximately parallel arms 21 at the distal ends of the arms 21. The bar 14, in this view, is approximately perpendicular to the arms 21, but it should be understood that the bar 14 may be angled, curved, or the like, without straying from the scope of the present invention. In this position, bar 14 and arms 21 are locked in place as controlled by latch 13. A loading dock vehicle restraining system (not shown) may connect to the bar 14 when the trailer 10 is backed up to a loading dock, thereby holding the trailer 10 in position relative to the loading dock.

Figure 3:
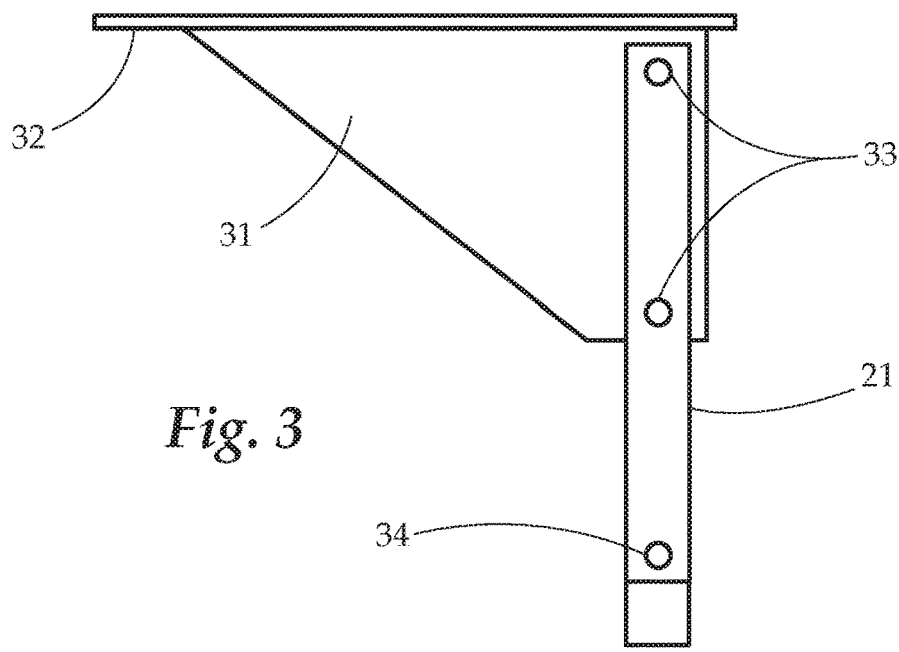
FIG. 3 provides a side view of an embodiment of the present invention.

FIG. 3 provides a side view of an embodiment of the loading dock locking system of the present invention. In this view, the U-shaped member is in the vertical position with arms 21 extending downward. The U-shaped member is mounted below a floor 32 of the trailer storage area to the trailer's structure. A gusset plate 31 extends from the floor downward to provide support for the arms 21 when in the vertical position. A plurality of apertures are formed in the arm 21. A front aperture 34 is to receive a pin when the U-shaped member is in the stowed position (see FIG. 1). The pin may be a spring loaded pin that holds the U-shaped member in place. This same pin may be used to secure arm 21 in the vertical extended position by fitting into the upper aperture 33. A third aperture 33 is positioned approximately midway down the length of the arm 21. This aperture 33 can receive a second pin to lock the arm 21 in the vertical position.

Figure 4:
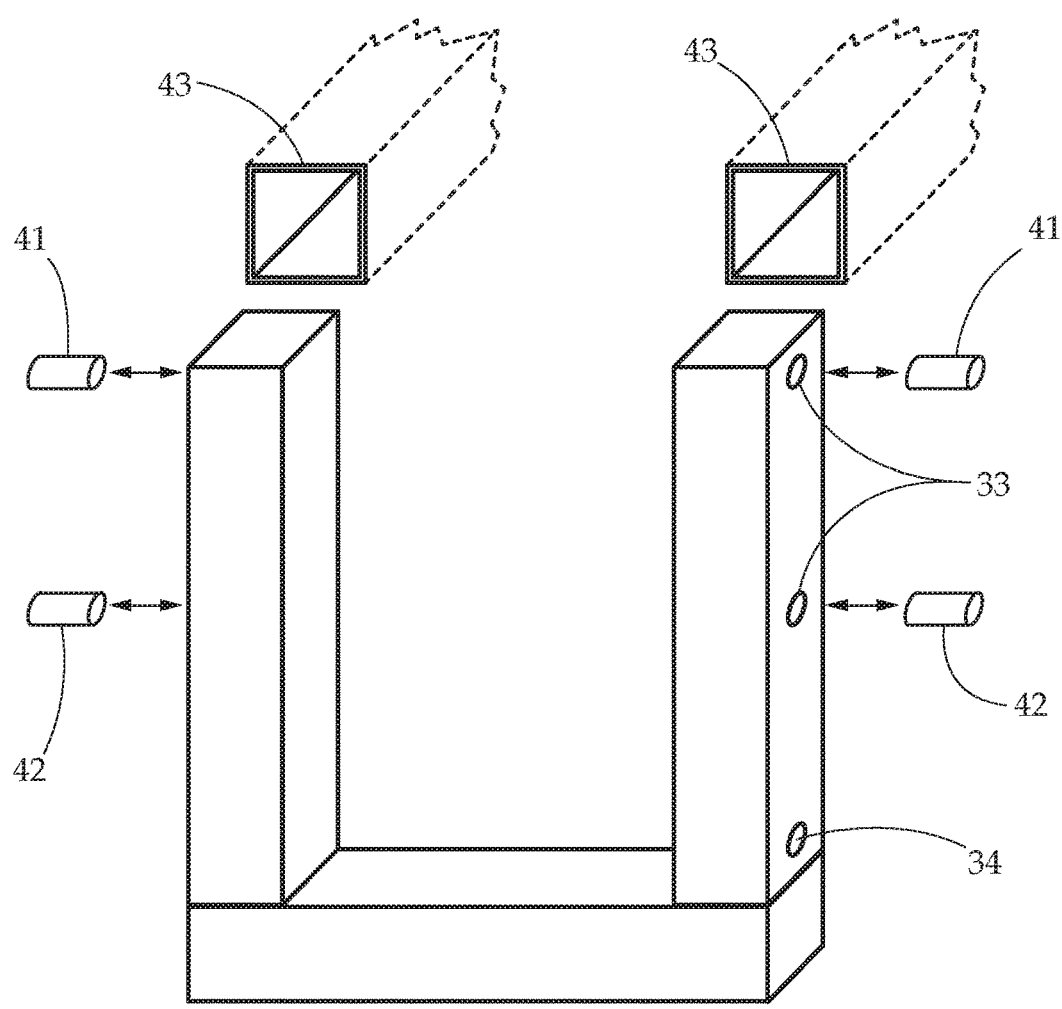
FIG. 4 provides a perspective view of an embodiment of the present invention.

FIG. 4 provides a perspective view of an embodiment of the loading dock locking system of the present invention. In this view, U-shaped member having bar 14 and arms 21 is shown in the vertical position. Apertures 33 and 34 can be seen in each arm. Upper apertures 33 are receiving a main pin 41 and a secondary pin 42. Two channels 43 are shown, in this embodiment as square tubing. Channels 43 may serve to guide the slideable U-shaped member when moving between the stowed and vertical extended position, in other embodiments, any structure may be used to guide the U-shaped member, such as a track, a roller, and the like, without straying from the scope of the present invention. Regardless of embodiment, the structure required to retain the U-shaped member in the stowed position may be mounted to the vehicle's structural members, such as beams, body, or other framing.

Figure 5:
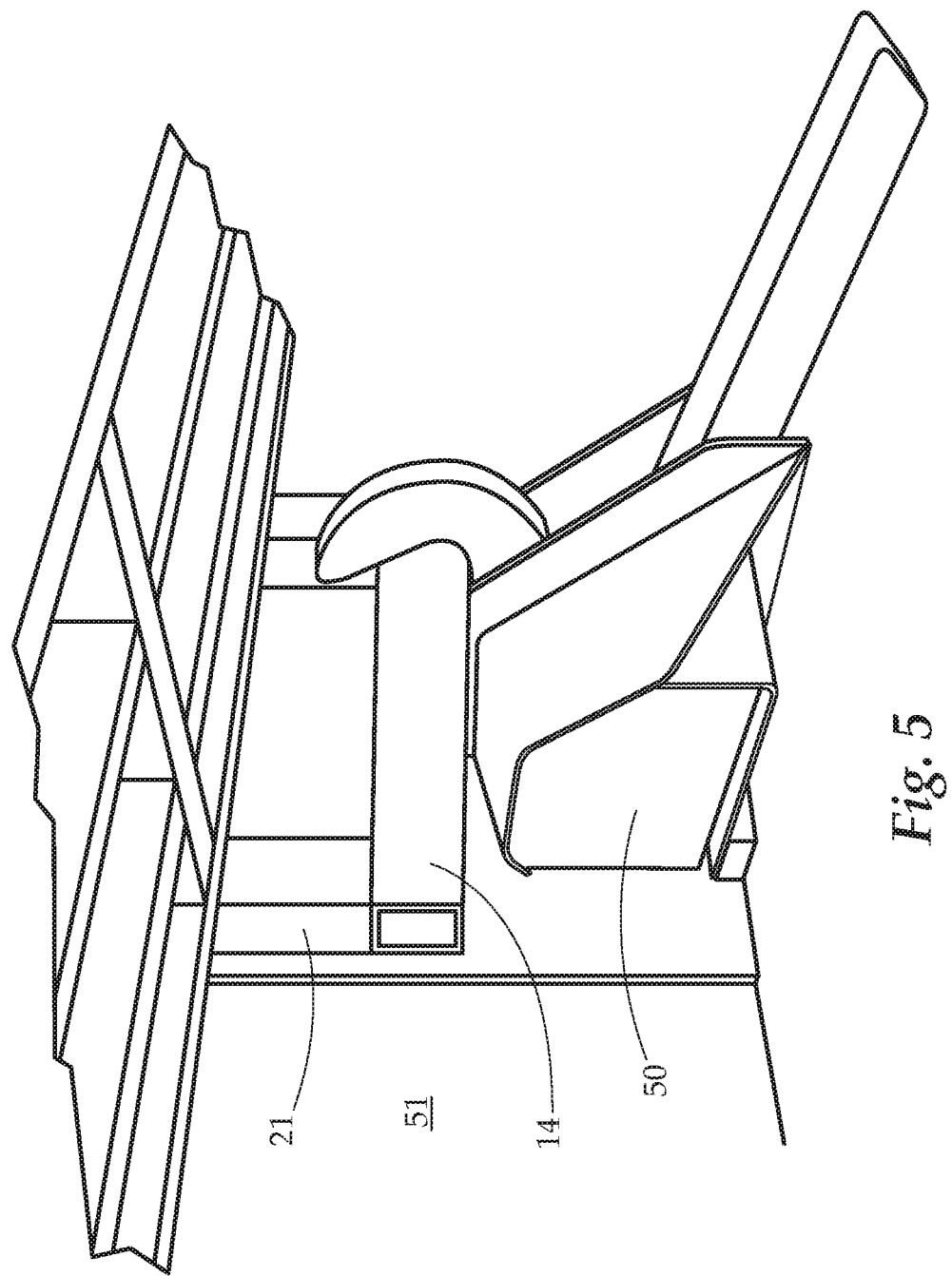
FIG. 5 provides a view of an embodiment of the present invention engaged with a loading dock restraining system.

FIG. 5 provides a view of an embodiment of the present invention locked in place to a loading dock. In this view, the trailer is backed up against a wall 51 of the loading dock. A vehicle restraining system 50 is mounted to the wall 51 and connects to the bar 14 of the U-shaped member when in its vertical locking position. As such, when the locking structure is connected to the U-shaped member, the trailer to which it is attached to is locked in position adjacent to the wall 51. This allows safe and reliable loading of the trailer without a danger of it accidentally rolling away from the wall.

Figure 6:
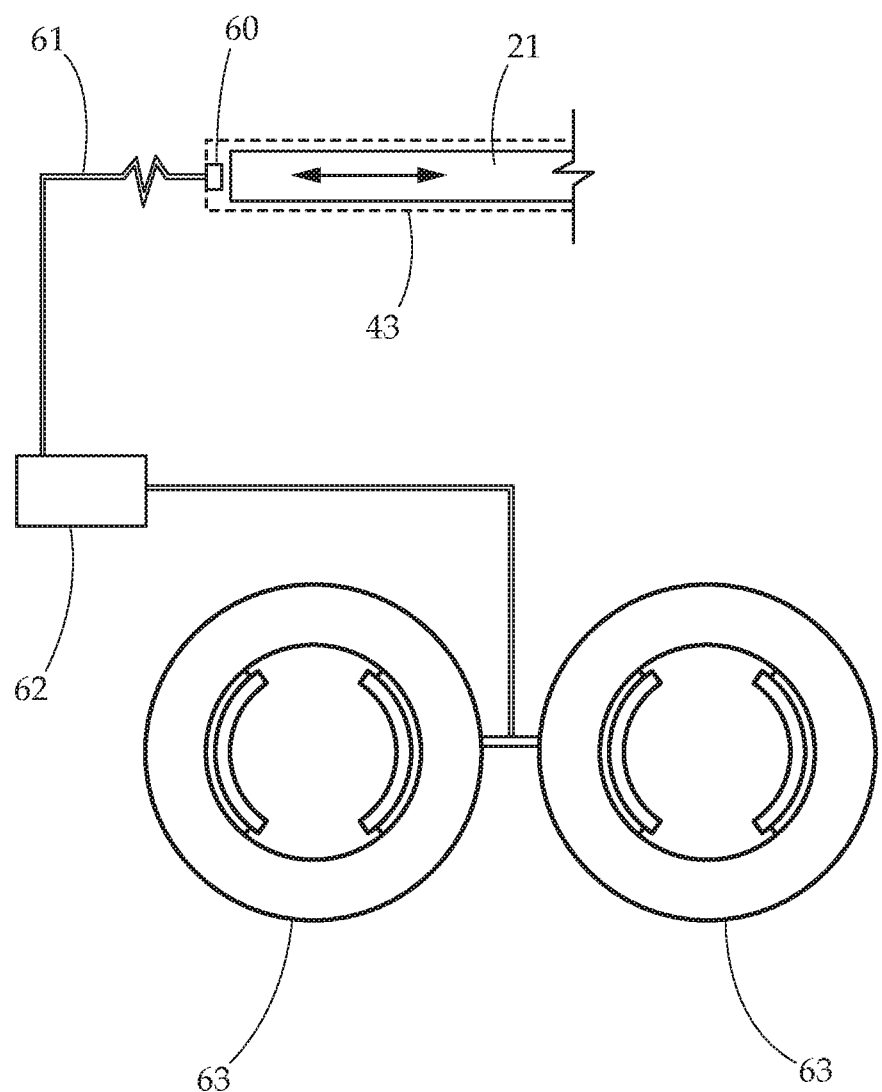
FIG. 6 provides a schematic view of an embodiment of a safety system of the present invention.

FIG. 6 provides a schematic view of an embodiment of a safety mechanism of the present invention. In this embodiment, the safety mechanism is configured to activate the braking system of the trailer if the arm 21 of the U-shaped member is not contacting a switch 60 to ensure that it is fully in the stowed position. As such, the safety mechanism ensures that the trailer cannot be hauled away and taken on the road ways until it is fully stowed. In one embodiment, the safety braking system may activate once the trailer is moving at a certain speed, to allow for some movement of the trailer away from the loading dock to allow for positioning of the trailer and to create enough space for the U-shaped member to be moved to the stowed position. In one embodiment, the safety mechanism may allow movement of the wheels up to 10 mph before the brakes are applied. In another embodiment, the safety mechanism may allow movement of the wheels up to 5 mph before the brakes are applied. In yet another embodiment, the safety mechanism may allow movement of the wheels up to 3 mph before the brakes are applied.

As is shown in FIG. 6, arm 21 is slideably movable along its length within channel 43. When arm 21 is fully stowed, its proximal end will contact switch 60, which is shown here as a button but can be any sort of physical actuator. Switch 60 is in communication (physical, hydraulic, pneumatic, electronic, or otherwise) with a braking system 62 of the trailer. The braking system is then able to activate or, if the switch 60 is depressed by arm 21, deactivate the brakes 63 on the wheel (s) of the trailer.

Figure 7:
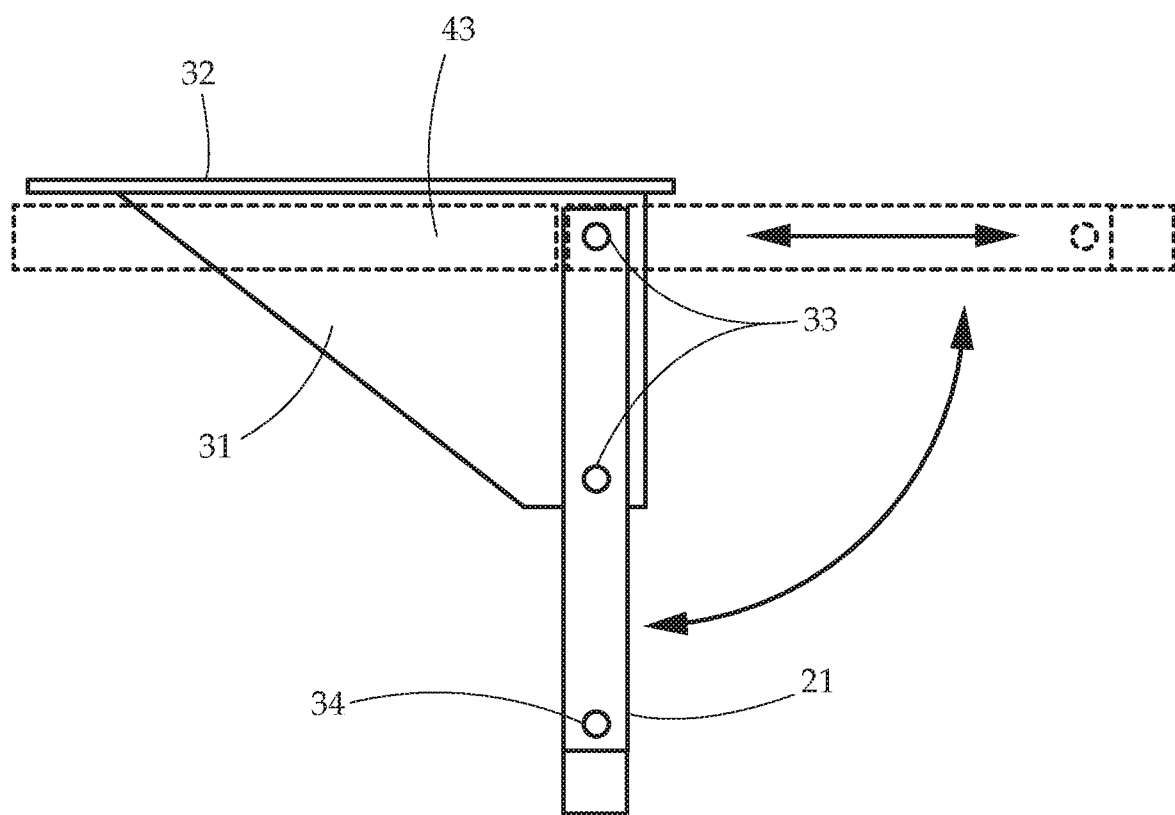
FIG. 7 provides a side view of an embodiment of the present invention in operation.

FIG. 7 provides a side view of an embodiment of the present invention and the operability of this embodiment. In this view, the U-shaped member is shown in solid lines in the vertical position with arms 21 extending downward. The U-shaped member is mounted below a floor 32 of the trailer storage area to the trailer's structure. A plurality of apertures are formed in the arm 21—a front aperture 34 and upper apertures 33. As is demonstrated by the curving arrow, the arm 21, and the rest of the U-shaped member can move between the vertical locking position (shown in solid lines) to the horizontal maximum extended position (shown in broken lines). Once in this maximum extended position, the arm 21 and the rest of the U-shaped member can move along an approximately horizontal plane into (and out of) channel 43 as indicated by the horizontal arrow. Once the U-shaped member is sufficiently within channel 43, it will be in a stowed position allowing, for example, use of a mechanical lift, access to under the vehicle, and the like.

Figure 8:
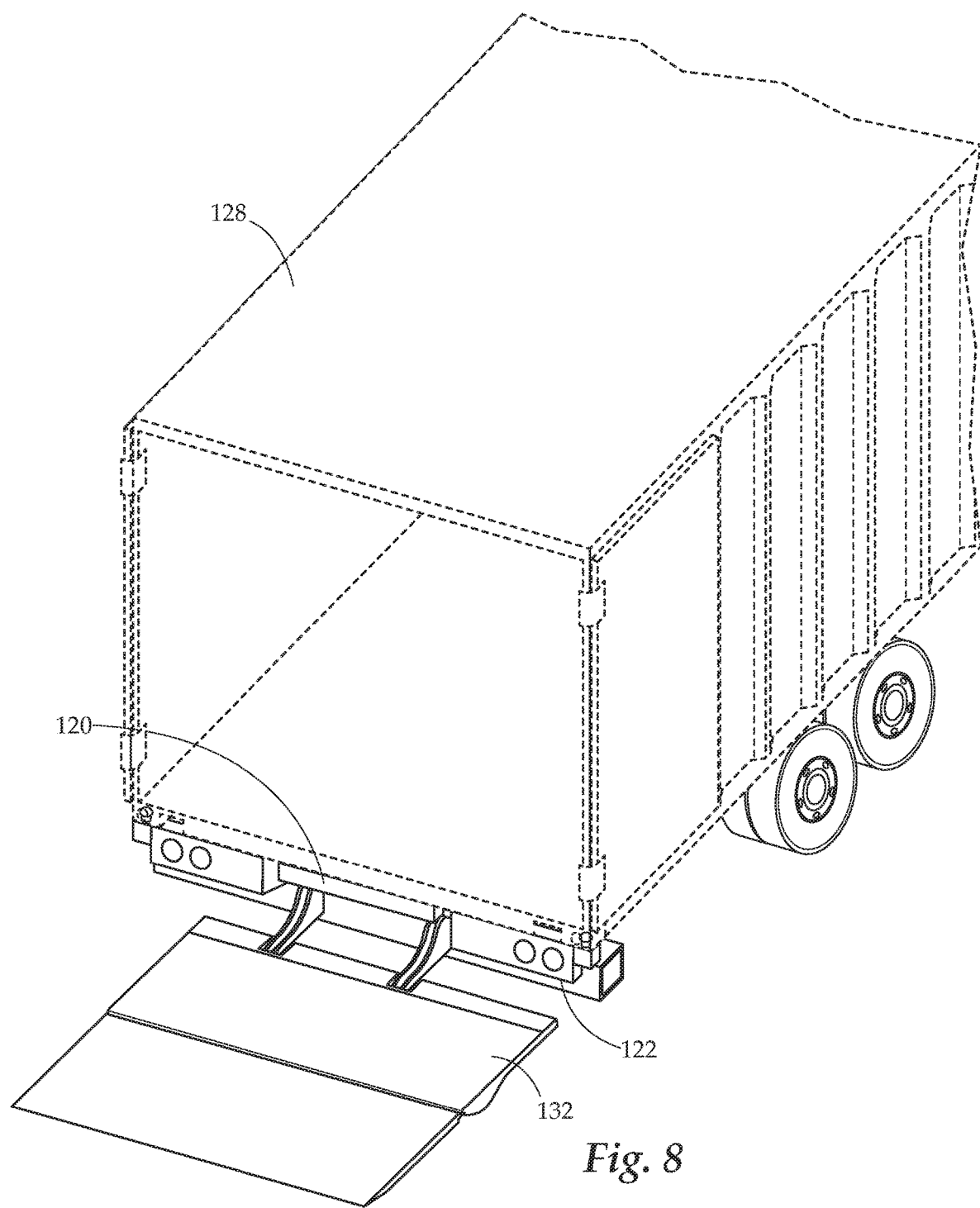
FIG. 8 provides a perspective view of an improved embodiment of the present invention (with a container mounted thereon shown in broken line as environmental structure, not comprising a portion of the invention), with a slideout liftgate shown lowered to the ground.

FIG. 8 provides a perspective view of an improved embodiment of the present invention (with a container 128 mounted thereon shown in broken line as environmental structure, not comprising a portion of the invention), with a slideout liftgate 132 shown lowered to the ground. The U-shaped member 120 is mounted rearward of the bolster 122 of a chassis for an intermodal shipping container 128. The bolster 122 is a structural member on the chassis that has twist locks on the right and left ends to attach the shipping container 128.

Figure 9:
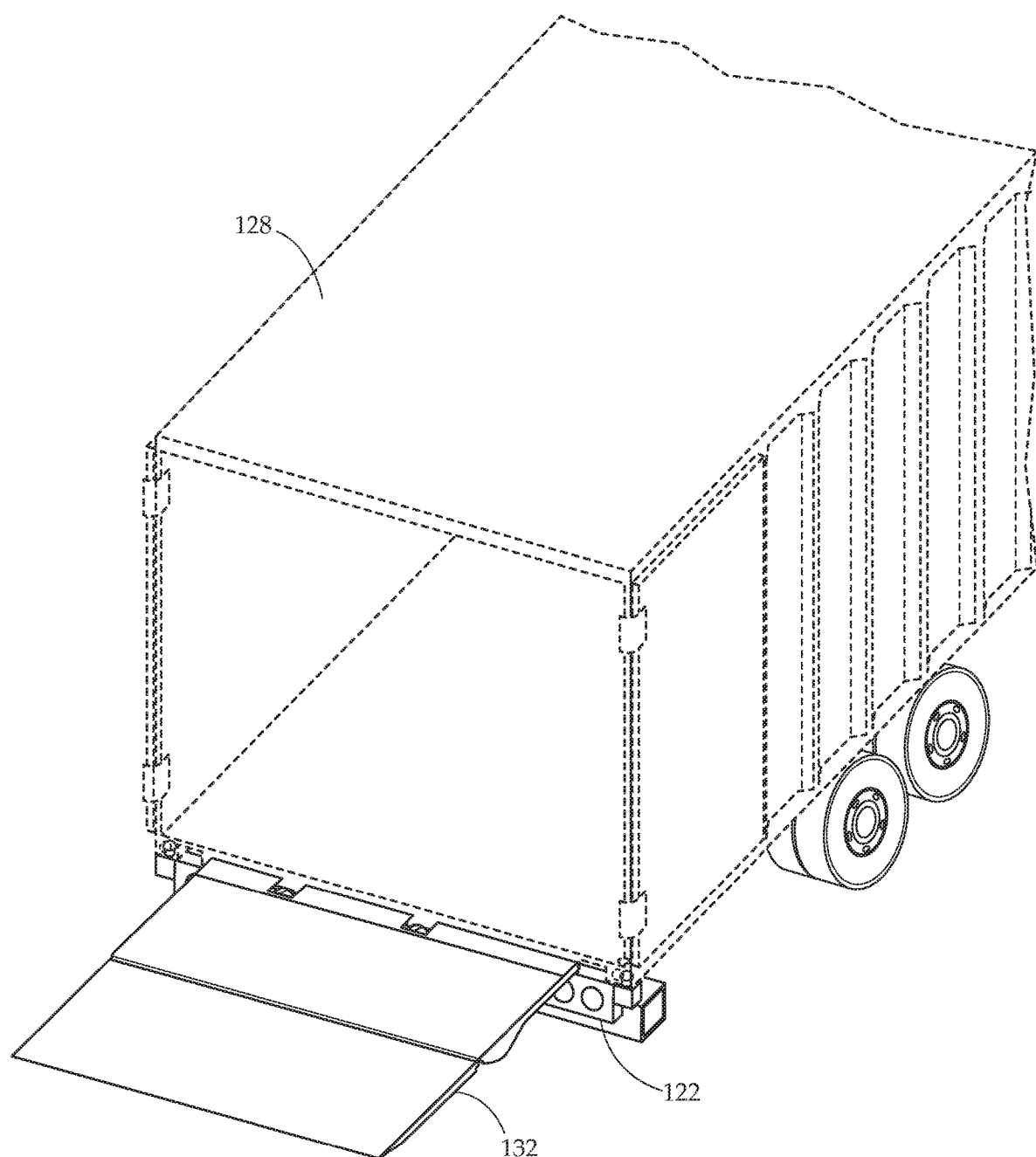
FIG. 9 provides a perspective view of an improved embodiment of the present invention (with a container mounted thereon shown in broken line as environmental structure, not comprising a portion of the invention), with the slideout liftgate shown in the raised position, abutting the elevated interior floor of the container.

FIG. 9 provides a perspective view of an improved embodiment of the present invention (with a container 128 mounted thereon shown in broken line as environmental structure, not comprising a portion of the invention), with the slideout liftgate 132 shown in the raised position, abutting the interior floor of the container.

Figure 10:
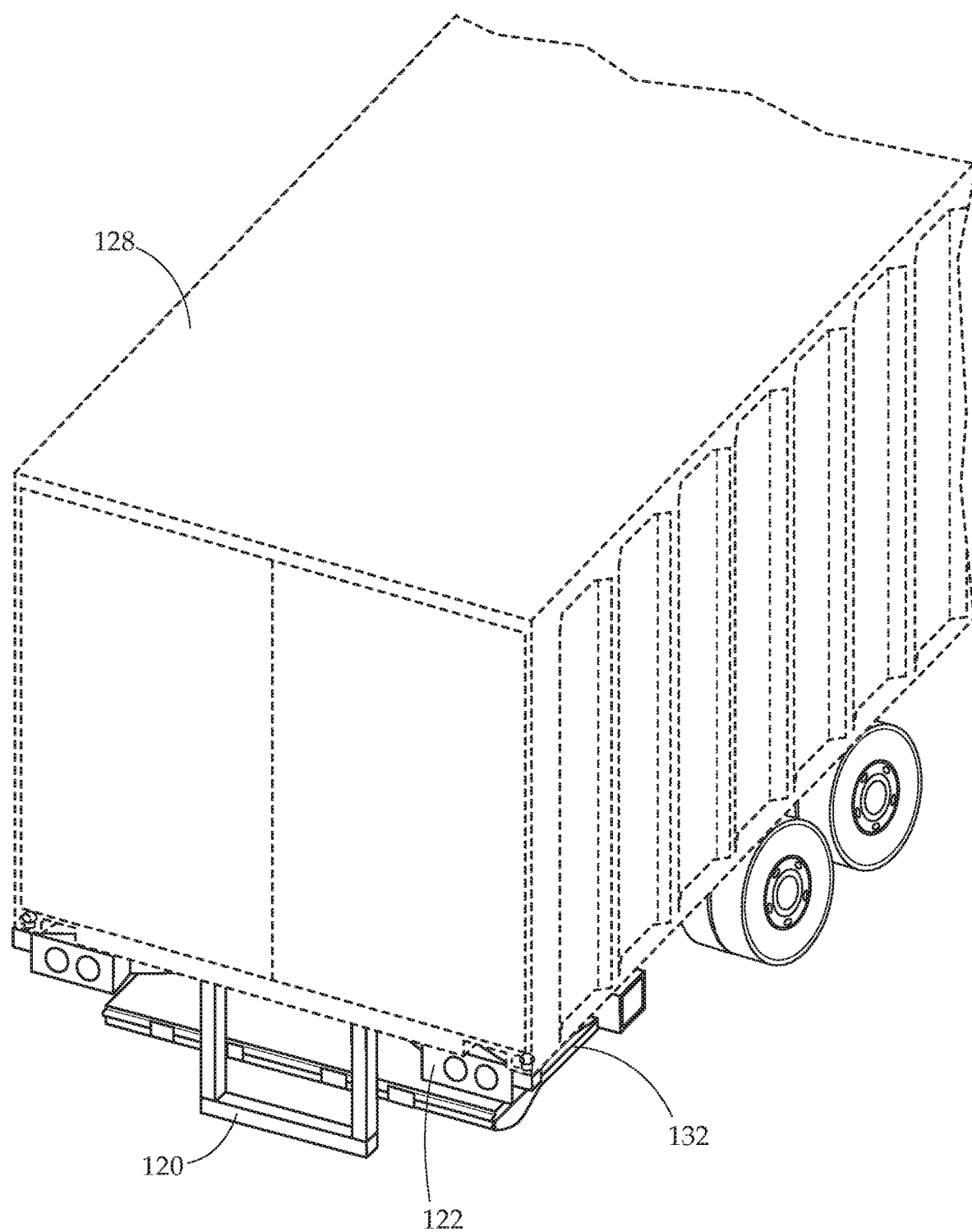
FIG. 10 provides a perspective view of art improved embodiment of the present invention, (with a container mounted thereon shown in broken line as environmental structure, not comprising a portion of the invention), with the slideout liftgate in the retracted position and the U-shaped member shown in the lowered position.

FIG. 10 provides a perspective view of an improved embodiment of the present invention (with a container 128 mounted thereon shown, in broken line as environmental structure, not comprising a portion of the invention), with the slideout liftgate 132 in the retracted position and the U-shaped member 120 shown in the lowered position.

Figure 11:
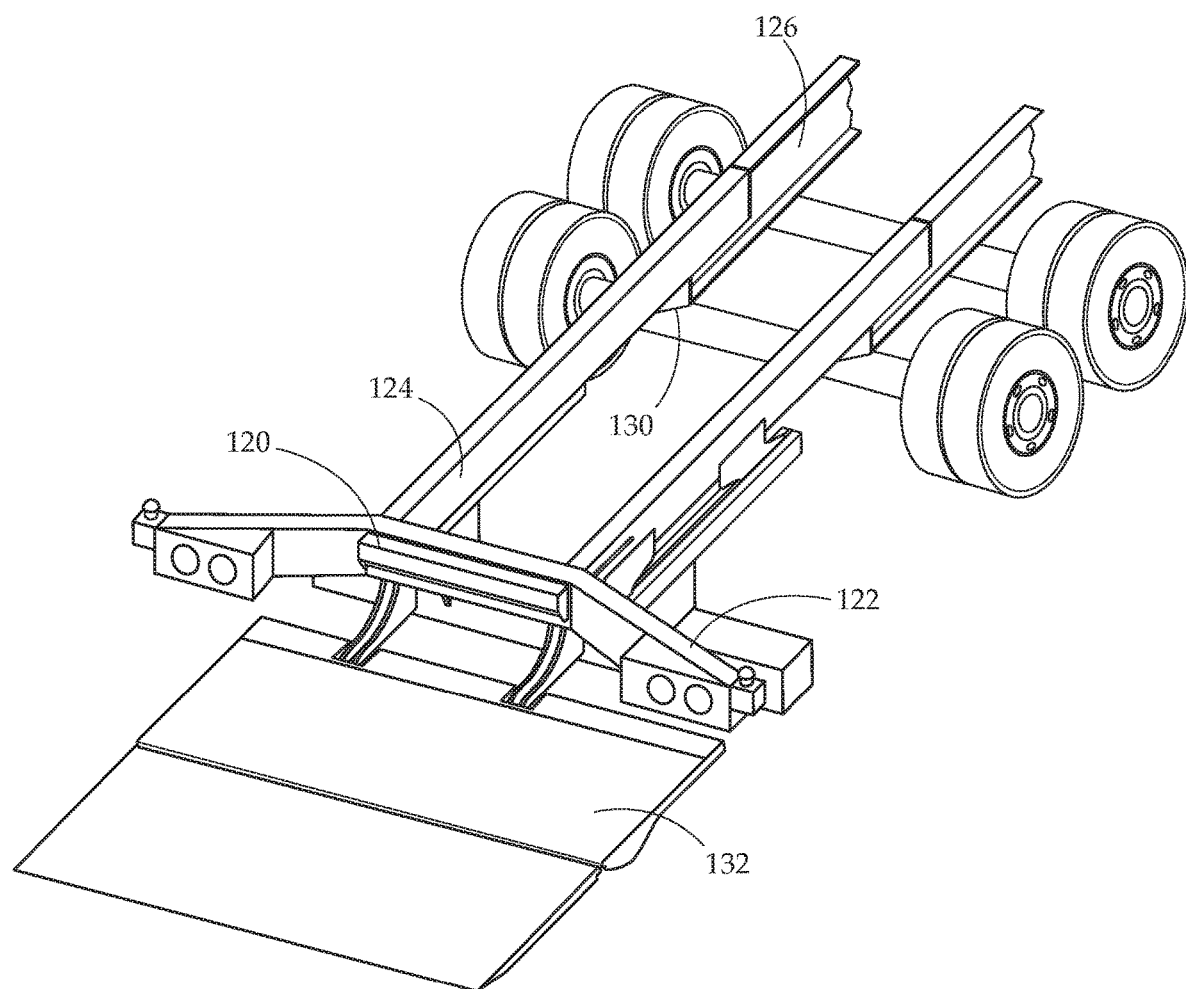
FIG. 11 provides a perspective view of an improved embodiment of the present invention with the slideout liftgate in the lowered position.

FIG. 11 provides a perspective view of an improved embodiment of the present invention with the slideout liftgate 132 in the lowered position. As can be seen, the bolster 122 has twist locks at the left and right ends for attaching a container, and the central portion extends forwardly to provide room to accommodate the U-shaped member 120. Conventionally, the chassis comprises two parallel I beams 126. If necessary, portions of the I beams 126 can be cut away and substituted with box beams 124 near the rear to accommodate mounting of the U-shaped member 132 (see FIG. 16). Optionally also, triangular gusset plates 130 (see FIG. 18) can be provided on the I beams 126 for reinforcement of the box beams 124.

Figure 12:
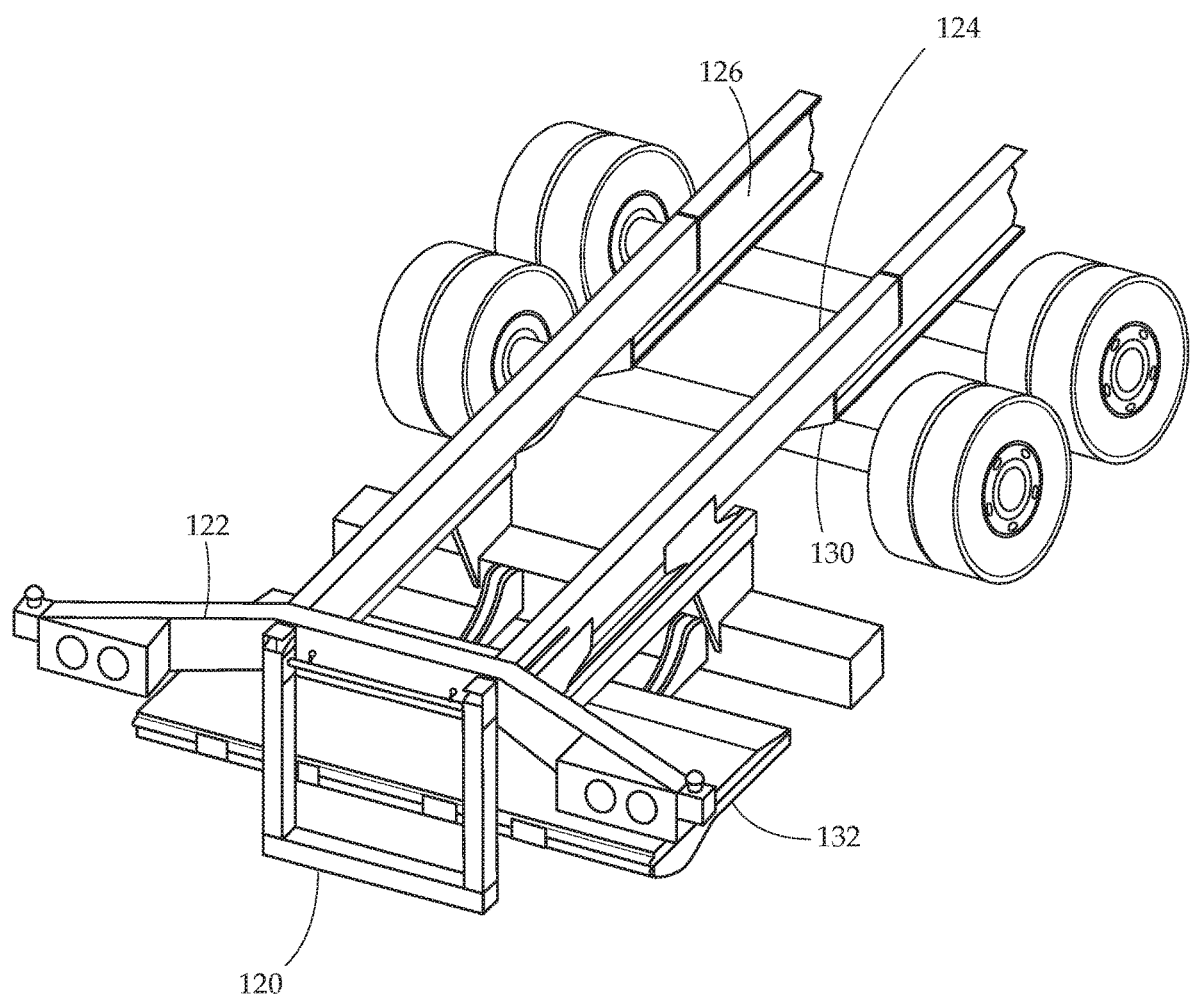
FIG. 12 provides a perspective view of an improved embodiment of the present invention with the slideout liftgate retracted and the U-shaped member in the lowered position.

FIG. 12 provides a perspective view of an improved embodiment of the present invention with the slideout liftgate 132 retracted and the U-shaped member 120 in the lowered position.

Figure 13:
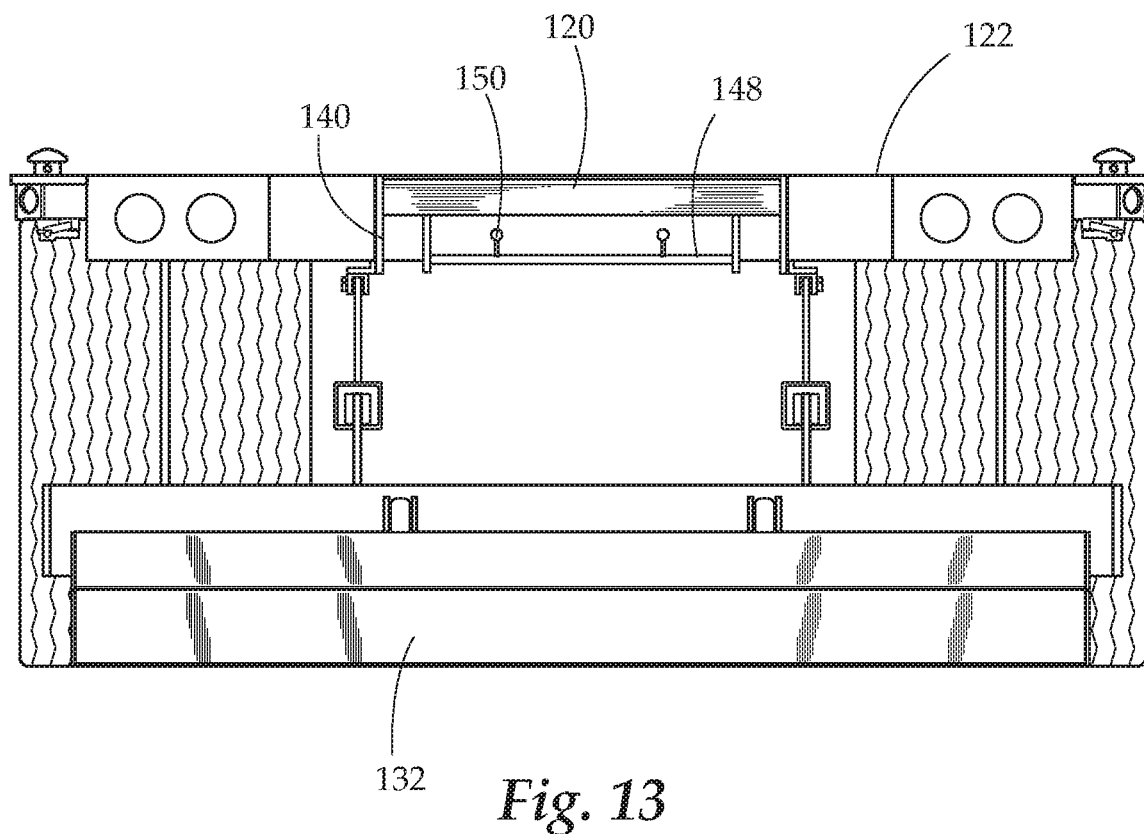
FIG. 13 provides an elevational view from the rear of an improved embodiment of the present invention with the slideout liftgate lowered to the ground.

FIG. 13 provides an elevational view from the rear of an improved embodiment of the present invention with the slide-out liftgate 132 lowered to the ground. Vertical gusset plates 140 are shown, that interact with a sliding lock pin tubular housing 148 having sliding lock pins 150 (see FIG. 16).

Figure 14:
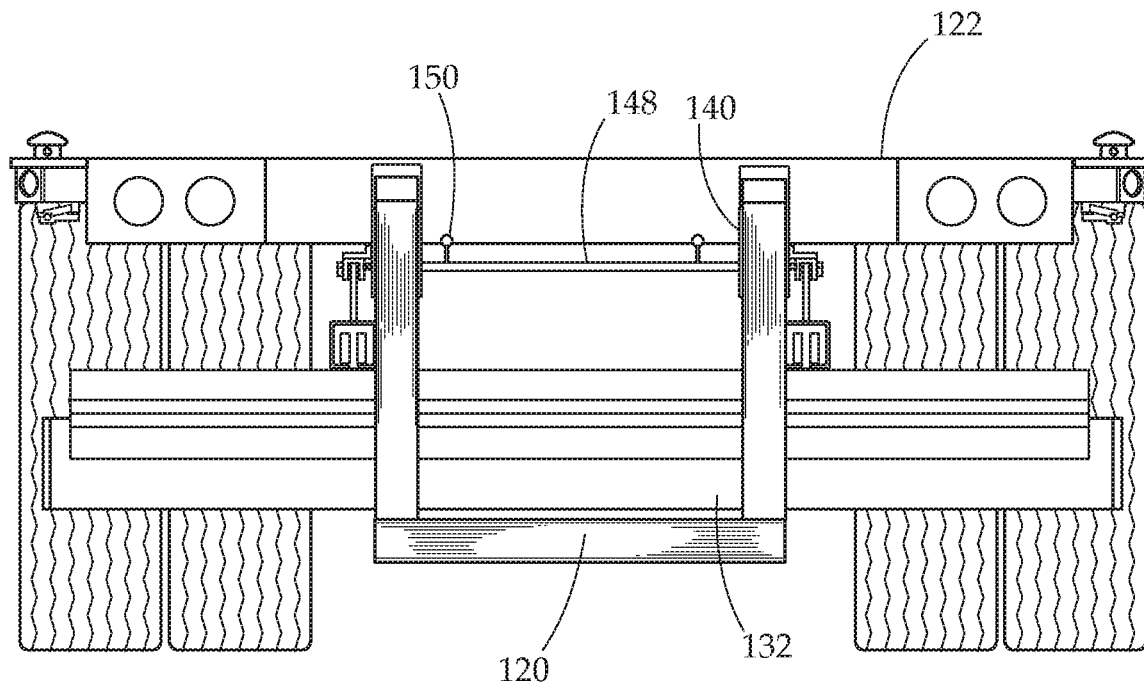
FIG. 14 provides an elevational view from the rear of an improved embodiment of the present invention with the slideout liftgate retracted and the U-shaped member in the lowered position.

FIG. 14 provides an elevational view from the rear of an improved embodiment of the present invention with the slideout liftgate 132 retracted and the U-shaped member 120 in the lowered position.

Figure 15:
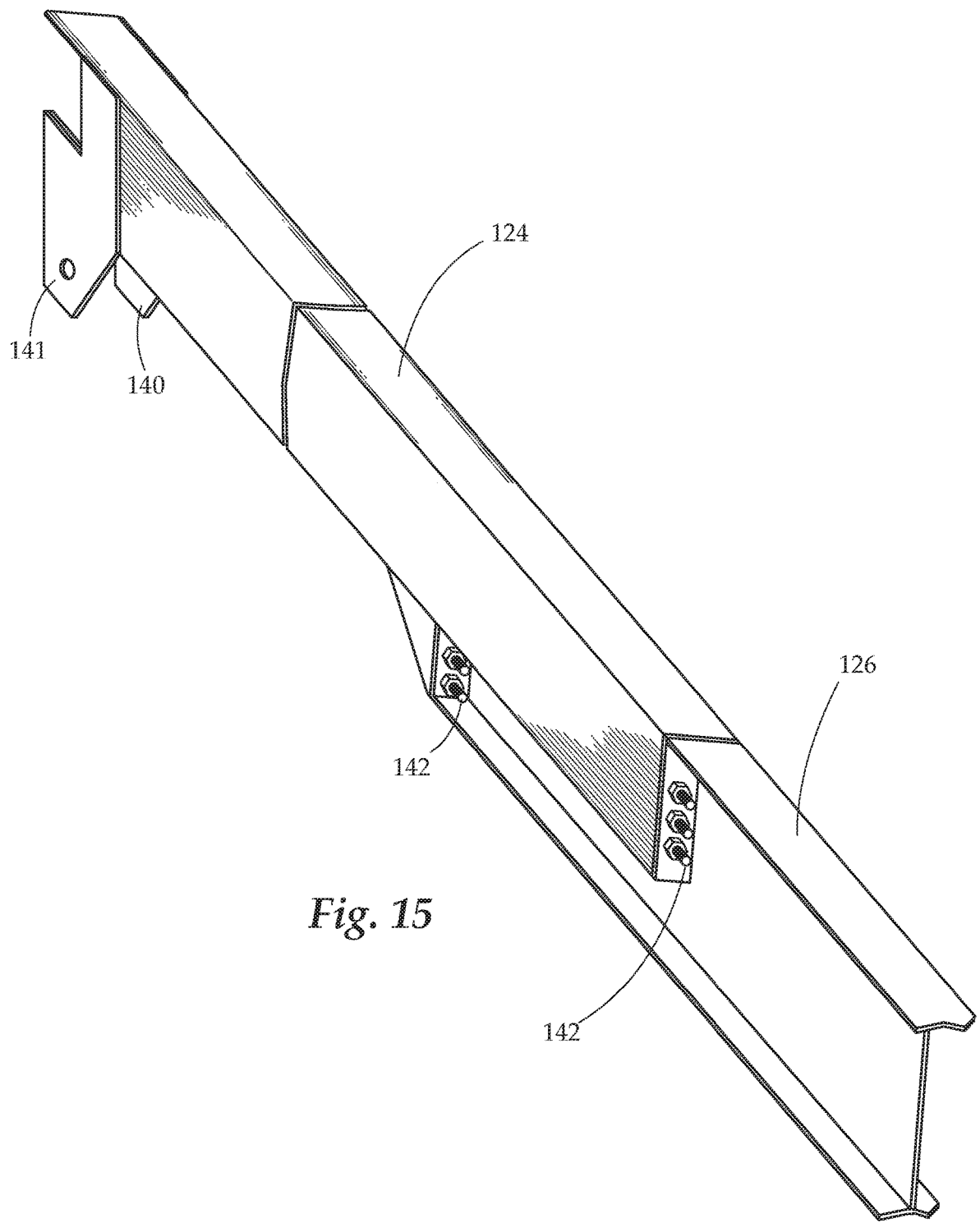
FIG. 15 provides a perspective view from the front of the rear portion of an I beam and box beam of an improved embodiment of the present invention.

FIG. 15 provides a perspective view from the front of the rear portion of one of the I beams 126 and box beam 124 of an improved embodiment of the present invention. Part of the I beam 126 has been cut away to accommodate the slideout liftgate and the box beam 124 has been secured by bolts 142.

Figure 16:
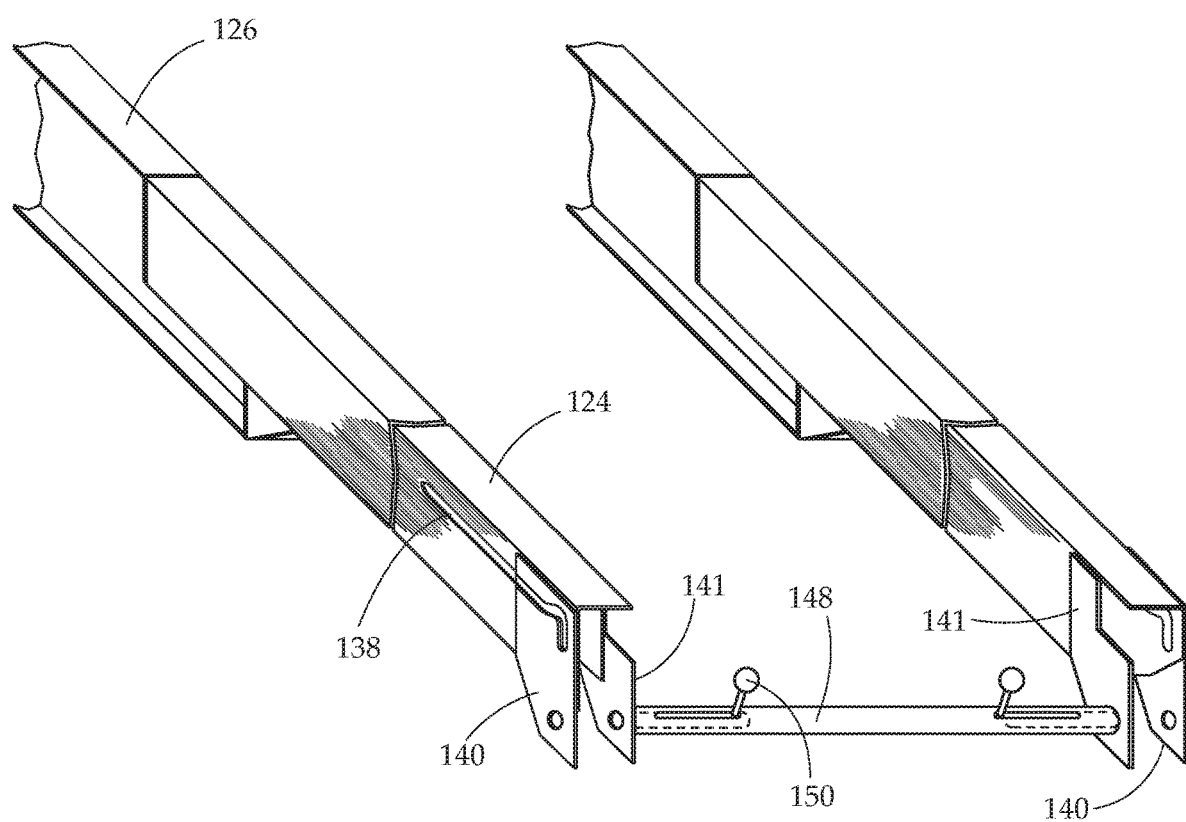
FIG. 16 provides a perspective view from the tear of an improved embodiment of the present invention, with the pins for engaging the U-shaped member retracted, and the U-shaped member, bolster and other structure omitted for clarity.

FIG. 16 provides a perspective view from the rear of an improved embodiment of the present invention, with the sliding lock pins 150 for engaging the U-shaped member in the retracted position. As can be seen, the exterior vertical gusset plates 140 have ride tracks 138 for receiving pins to the U-shaped member to guide the U-shaped member as it is extended and retracted. The sliding lock pin tubular housing is mounted on interior vertical gusset plates 141.

Figure 17:
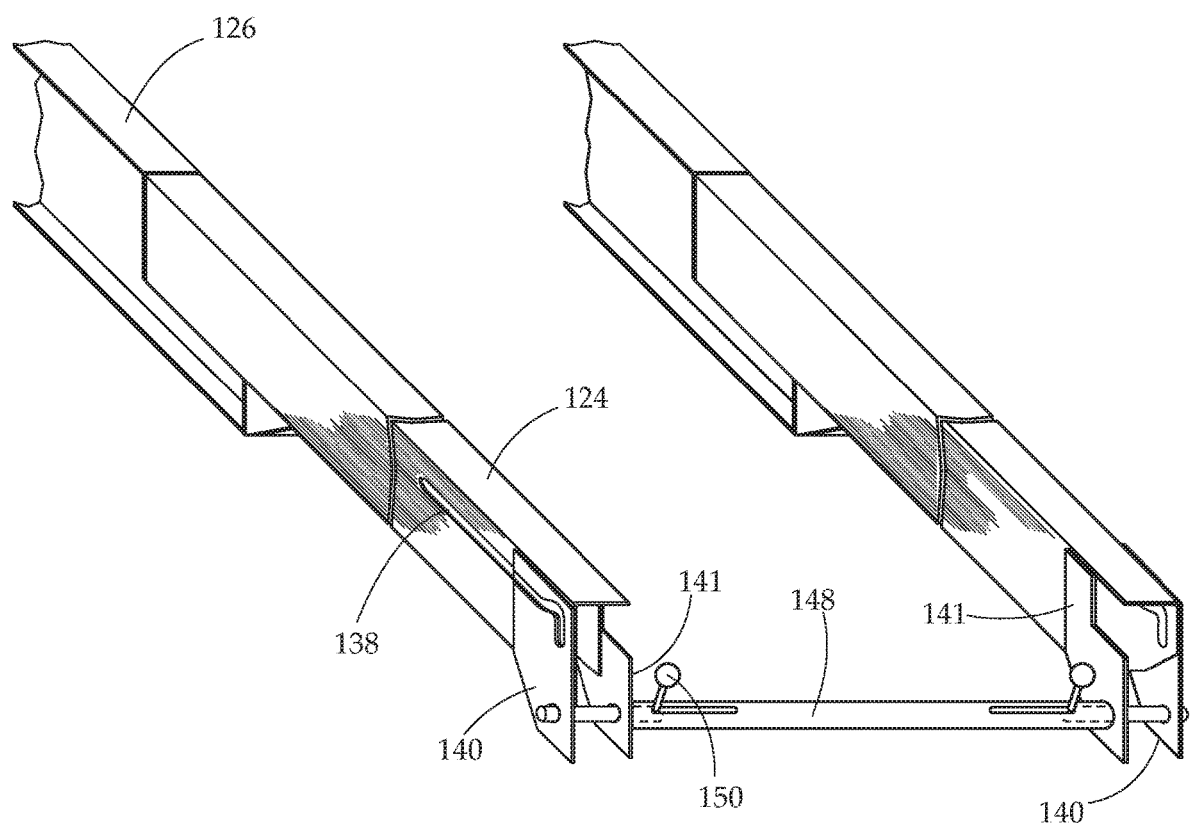
FIG. 17 provides a perspective view from the rear of an improved embodiment of the present invention, with the pins for engaging the U-shaped member extended, and the U-shaped member, bolster and other structure omitted for clarity.

FIG. 17 provides a perspective view from the rear of an improved embodiment of the present invention, with the sliding lock pins 150 for engaging the U-shaped member extended and engaged with apertures in the exterior vertical gusset plates.

Figure 18:
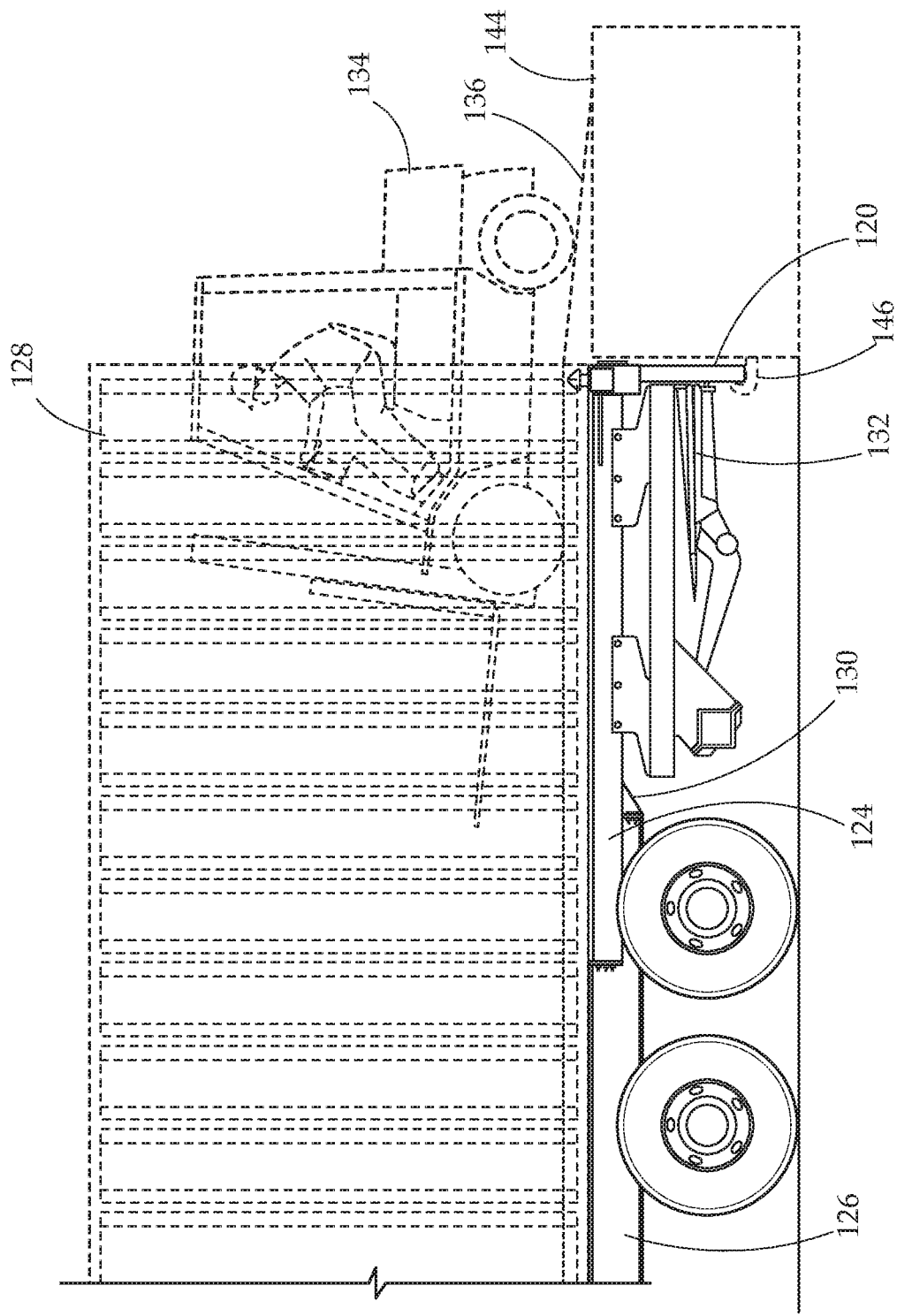
FIG. 18 provides a side elevational view of an improved embodiment of the present invention (with a container mounted thereon, forklift, loading dock, dock restraint hook and dock leveler shown in broken line as environmental structure, not comprising a portion of the invention) with the slideout liftgate retracted and the U-shaped member in the lowered position, abutting against a loading dock, being restrained by the U-shaped member to the loading dock, and being unloaded by a forklift.

FIG. 18 provides a side elevational view of an improved embodiment of the present invention (with a container 128 mounted thereon, forklift, loading dock, dock restraint book and dock leveler shown in broken line as environmental structure, not comprising a portion of the invention) with the slideout liftgate 132 retracted and the U-shaped member 120 in the lowered position, abutting against a loading dock 144, being restrained by the U-shaped member 120 to the loading dock 144 by a dock restraint hook 146, and being unloaded by a forklift 134 on a dock leveler 136.

Figure 19:
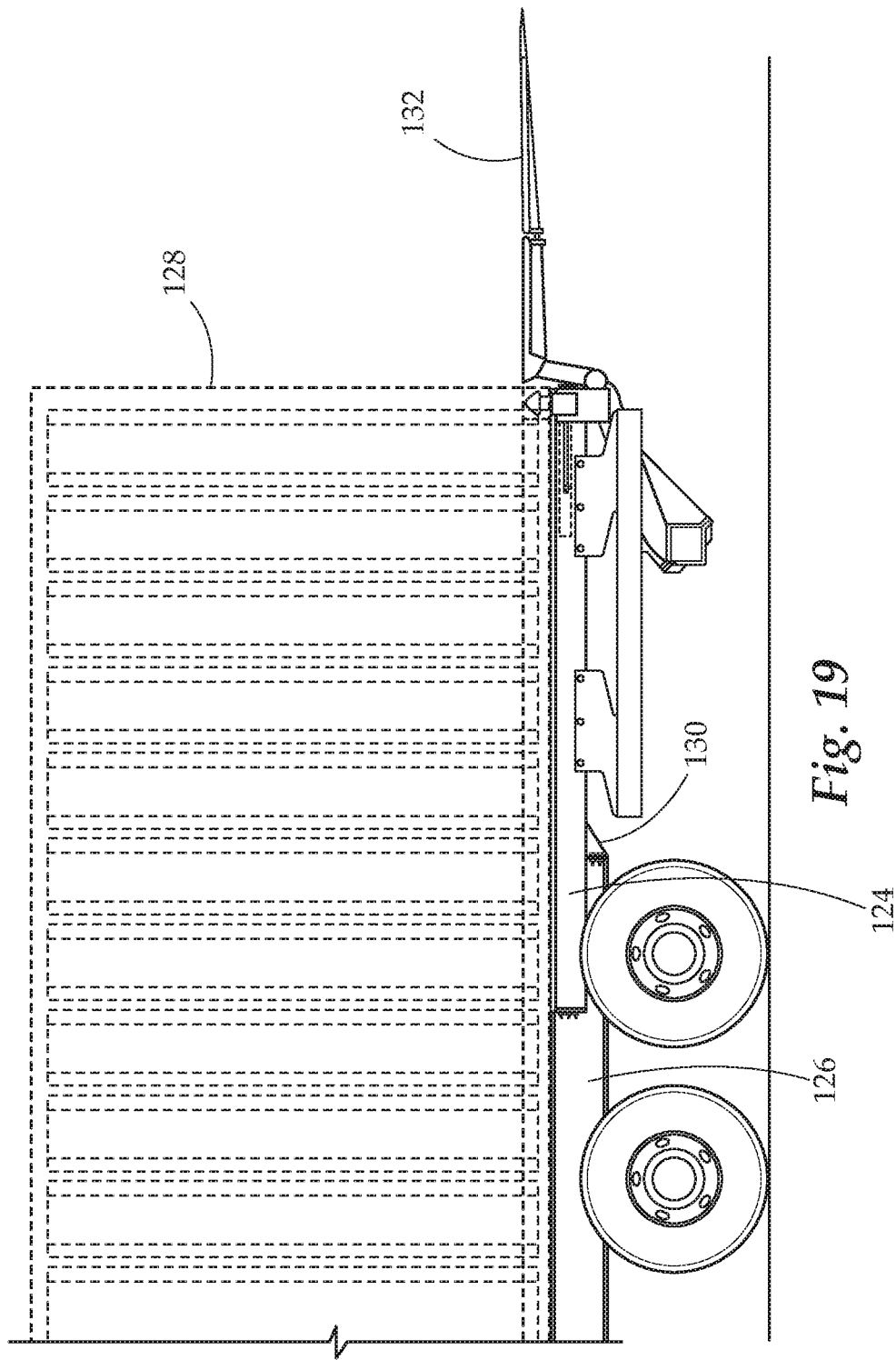
FIG. 19 provides a side elevational view of an improved embodiment of the present invention (with a container mounted thereon shown in broken line as environmental structure, not comprising a portion of the invention) with a slideout liftgate shown in the raised position, abutting the interior floor of the container.

FIG. 19 provides a side elevational view of an improved embodiment of the present invention (with a container 128 mounted thereon shown in broken line as environmental structure, not comprising a portion of the invention) with a slideout liftgate 132 shown in the raised position, abutting the interior floor of the container.

Figure 20:
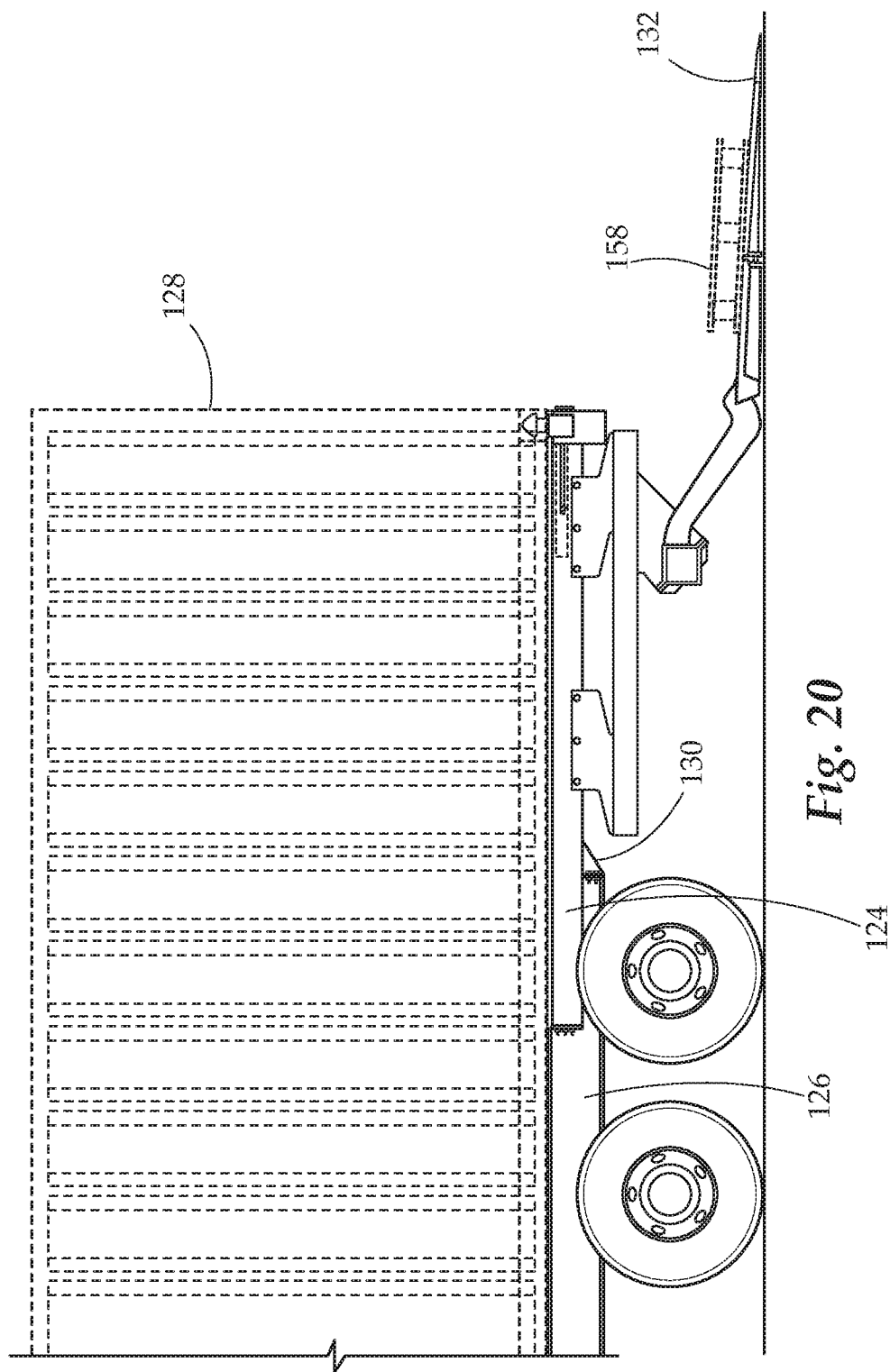
FIG. 20 provides a side elevational view of an improved embodiment of the present invention (with a container mounted thereon shown in broken line as environmental structure, not comprising a portion of the invention) with the slideout liftgate in the lowered position.

FIG. 20 provides a side elevational view of an improved embodiment of the present invention (with a container 128 mounted thereon shown in broken line as environmental structure, not comprising a portion of the invention) with the slideout liftgate 132 in the lowered position with a pallet 158 shown in broken line as environmental structure, not comprising a portion of the invention.

Figure 21:
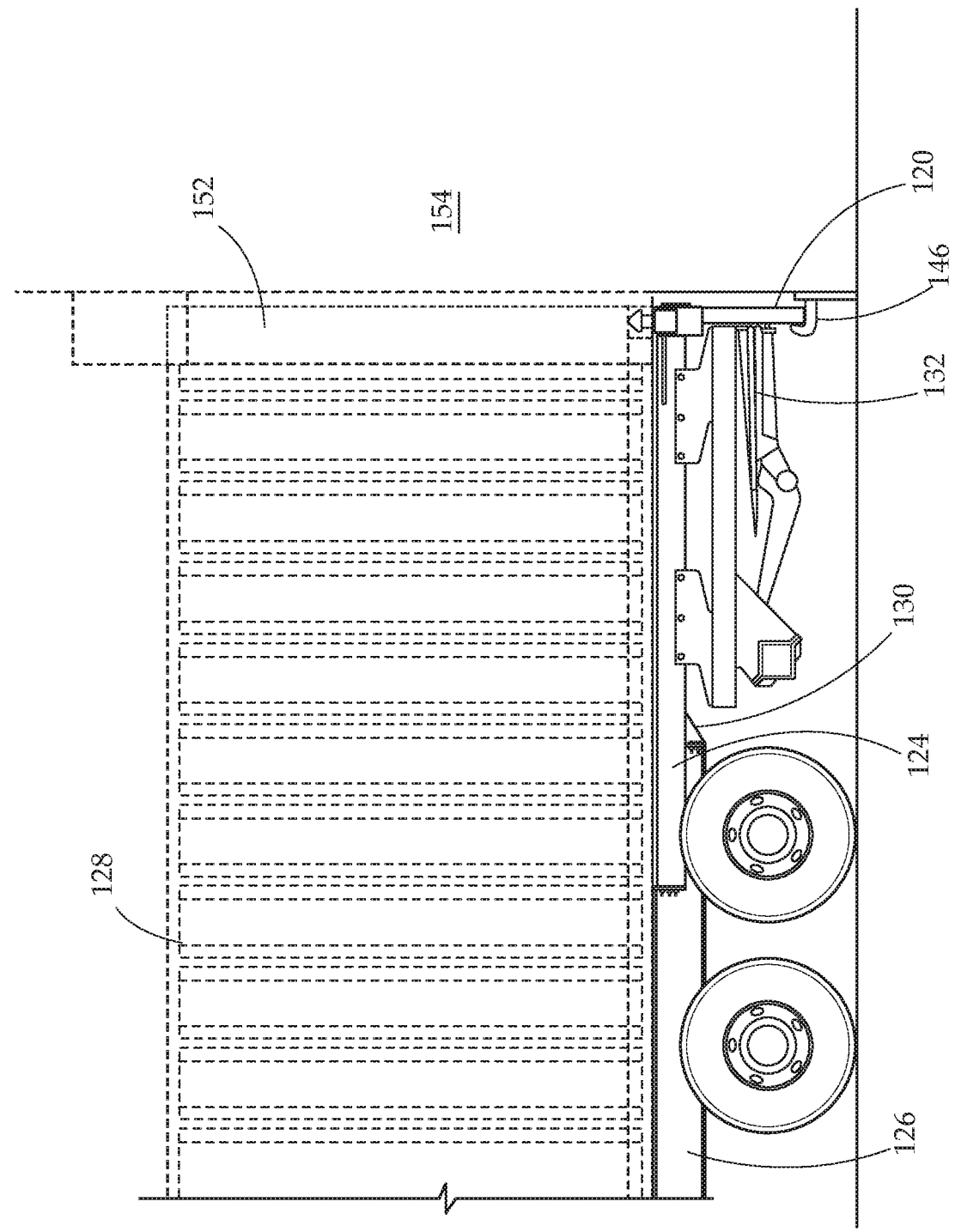
FIG. 21 provides a side elevational view of an improved embodiment of the present invention (with a container mounted thereon and a sealing engagement apparatus and closed loading dock shown in broken line as environmental structure, not comprising a portion of the invention), with the slideout liftgate retracted and the U-shaped member in the lowered position, abutting against a closed loading dock, and being restrained by the U-shaped member to the loading dock.

FIG. 21 provides a side elevational view of an improved embodiment of the present invention (with a container 128 mounted thereon shown in broken line as environmental structure, not comprising a portion of the invention), with the slideout liftgate 132 retracted and the U-shaped member 120 in the lowered position, abutting against a closed loading dock, structured as a door in a warehouse 154 having a loading dock seal 152, and being restrained by the U-shaped member to the loading dock 154 by a dock restraint hook 146. As can be seen, the sealing engagement apparatus 152 sealingly engages the rear end of the container for loading and unloading.

Figure 22:
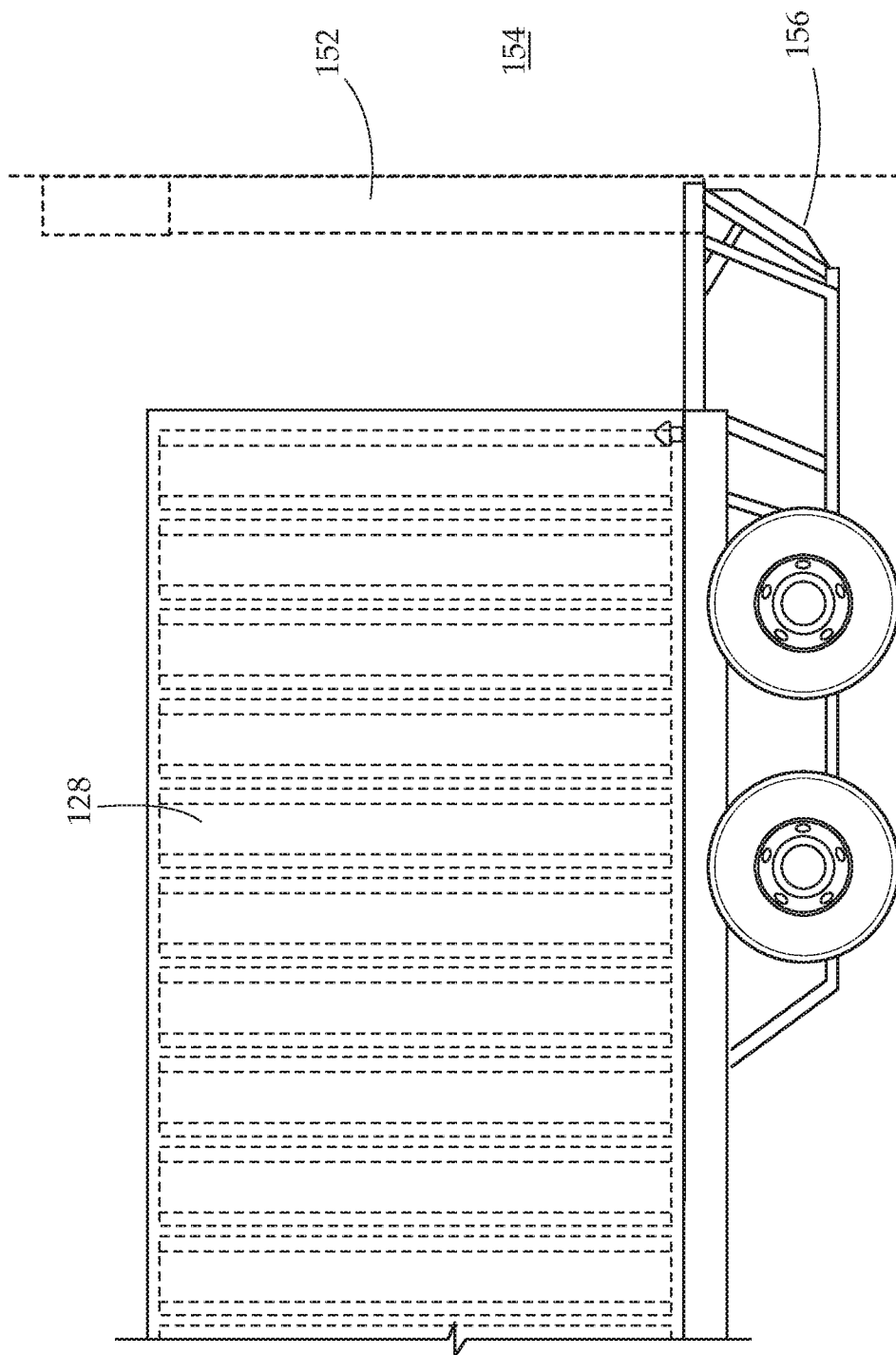
FIG. 22 provides a rear elevational view of a conventional chassis with a container mounted thereon and having a platform extension (with the closed loading dock and sealing engagement apparatus shown in broken line for clarity), showing that the platform extension prevents the rear of the container from sealing against the periphery of a closed loading dock.

FIG. 22 provides a rear elevational view of a conventional chassis with a container 128 mounted thereof and having a platform extension 156 according to U.S. Pat. No. 5,827,037 to Wilson (with the closed loading dock and sealing engagement apparatus shown in broken line for clarity), showing that the platform extension 156 prevents the rear of the container from engaging with the sealing engagement apparatus 152 of a closed loading dock 154.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A loading dock locking system for connection to a vehicle having a body with an elevated cargo space and a slideout liftgate, comprising:

a U-shaped member having at least one elongate arm and a bar connected to a distal end of the elongate arm, the bar configured to be locked to the loading dock;

wherein the U-shaped member is capable of being mounted to said body to be movable between a stowed position such that the arm is positioned under or within the body, having the U-shaped member oriented approximately parallel to a floor of the body, and a vertical locking position such that the arm is extended from the body and is oriented approximately vertically downward away from the body;

wherein said vertical locking position is rearward of said slideout liftgate, whereby said U-shaped member can be moved to said vertical locking position without being blocked by said slideout liftgate, and whereby when said U-shaped member is in said stowed position, said slideout liftgate can be deployed to provide a platform movable between abutting said elevated cargo space and the ground.

2. A chassis for an intermodal shipping container having fittings and a floor, comprising:

a body having twist locks to engage with said fittings for retaining said container on said body;

a plurality of wheels connected to the body;

a loading dock locking system connected to the body at a rear of the body, the loading dock locking system comprising:

a U-shaped member configured to be locked to a loading dock, the U-shaped member having at least one elongate arm and a perpendicular bar connected to a distal end of the elongate arm, the bar configured to be locked to the loading dock;

wherein the U-shaped member is movable between a stowed position for when the chassis is in transport such that the arm is positioned under or within the body, having the U-shaped member oriented approximately parallel to a floor of the body, and a vertical locking position for locking the chassis to the loading dock such that the arm is extended from the body and is oriented approximately vertically downward away from the body; and a liftgate mounted under said body and forward of said vertical locking position, whereby said U-shaped member can be moved to said vertical locking position without being blocked by said liftgate, and whereby when said U-shaped member is in said stowed position, said liftgate can be deployed to provide a platform movable between abutting said floor and the ground.

* * * * *